(12) United States Patent
Sakikawa

(10) Patent No.: US 8,144,346 B2
(45) Date of Patent: Mar. 27, 2012

(54) APPARATUS AND METHOD FOR CONTROLLING A DEVICE WITH A DEVICE DRIVER

(75) Inventor: Ichiro Sakikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 903 days.

(21) Appl. No.: 12/186,663

(22) Filed: Aug. 6, 2008

(65) Prior Publication Data

US 2009/0046318 A1    Feb. 19, 2009

(30) Foreign Application Priority Data

Aug. 16, 2007  (JP) ................................. 2007-212325
Jun. 5, 2008   (JP) ................................. 2008-148305

(51) Int. Cl.
*G06F 3/12*  (2006.01)

(52) U.S. Cl. ...... 358/1.13; 358/1.1; 358/1.15; 358/1.14; 358/1.16; 358/1.9; 709/221; 709/228; 715/744; 715/745; 715/747; 715/750

(58) Field of Classification Search ........ 358/1.13–1.16, 358/1.1, 1.17, 1.18; 715/744, 745, 747, 750; 709/221, 228

See application file for complete search history.

(56) References Cited

U.S. PATENT DOCUMENTS

| | | | | |
|---|---|---|---|---|
| 5,450,571 A | * | 9/1995 | Rosekrans et al. | 703/24 |
| 5,469,533 A | * | 11/1995 | Dennis | 358/1.15 |
| 5,630,076 A | * | 5/1997 | Saulpaugh et al. | 710/104 |
| 6,967,728 B1 | * | 11/2005 | Vidyanand | 358/1.12 |
| 7,031,000 B1 | * | 4/2006 | Kim | 358/1.1 |
| 7,195,408 B2 | * | 3/2007 | Nishiguchi | 400/76 |
| 7,913,189 B2 | * | 3/2011 | Baba | 715/847 |
| 2006/0023246 A1 | | 2/2006 | Vidyanand | |

FOREIGN PATENT DOCUMENTS

| | | |
|---|---|---|
| JP | 11-149362 | 6/1999 |
| JP | 2000-112683 | 4/2000 |
| JP | 2000-227849 | 8/2000 |
| JP | 2002-182871 | 6/2002 |
| JR | 2000-137589 | 5/2000 |

OTHER PUBLICATIONS

"PrintTicket and PrintCapabilities Support in Windows Print Drivers", Feb. 6, 2006, Microsoft Corporation.
Extended European Search Report dated May 25, 2011.

* cited by examiner

*Primary Examiner* — Twyler Haskins
*Assistant Examiner* — Dennis Dicker
(74) *Attorney, Agent, or Firm* — IPUSA, PLLC

(57) ABSTRACT

A data processing apparatus having a device driver part for controlling a device includes a storing part configured to store device capability data, a receiving part configured to receive a designation of a PrintTicket having setting data indicating control settings used for controlling the device, a determining part configured to determine whether the designated PrintTicket has been fabricated by the device driver part or another device driver part, a first controlling part configured to apply all of the setting data to the control settings in a case where the designated PrintTicket is determined to be fabricated by the device driver part, and a second controlling part configured to compare the device capability data with the setting data and apply at least a part of the setting data to the control settings in a case where the designated PrintTicket is determined to be fabricated by the other device driver part.

12 Claims, 29 Drawing Sheets

FIG.5

PrintCapabilities 500

```
<psf:Feature name="psk:PageMediaSize">                                226
    <psf:Option name="psk:ISOA6">
           <psf:ScoredProperty name="psk:MediaSizeWidth">
  224{              <psf:Value xsi:type="xsd:integer">105000</psf:Value>
           </psf:ScoredProperty>
216{       <psf:ScoredProperty name="psk:MediaSizeHeight">
  225{              <psf:Value xsi:type="xsd:integer">148000</psf:Value>
           </psf:ScoredProperty>
    </psf:Option>                                                     227
    <psf:Option name="psk:ISOA3">
           <psf:ScoredProperty name="psk:MediaSizeWidth">
                   <psf:Value xsi:type="xsd:integer">297000</psf:Value>
           </psf:ScoredProperty>
217{       <psf:ScoredProperty name="psk:MediaSizeHeight">
                   <psf:Value xsi:type="xsd:integer">420000</psf:Value>
           </psf:ScoredProperty>
    </psf:Option>
    <psf:Option name="psk:ISOA4">
           <psf:ScoredProperty name="psk:MediaSizeWidth">
                   <psf:Value xsi:type="xsd:integer">210000</psf:Value>
           </psf:ScoredProperty>                                            211
218{       <psf:ScoredProperty name="psk:MediaSizeHeight">
                   <psf:Value xsi:type="xsd:integer">297000</psf:Value>
           </psf:ScoredProperty>
    </psf:Option>
    <psf:Option name="psk:ISOB4">
           <psf:ScoredProperty name="psk:MediaSizeWidth">
                   <psf:Value xsi:type="xsd:integer">257200</psf:Value>
           </psf:ScoredProperty>
219{       <psf:ScoredProperty name="psk:MediaSizeHeight">
                   <psf:Value xsi:type="xsd:integer">364100</psf:Value>
           </psf:ScoredProperty>
    </psf:Option>
</psf:Feature>
<psf:Feature name="psk:JobInputBin">
   220—<psf:Option name="ns0000:AUTO" />
   221—<psf:Option name="psk:Manual" />      }212
   222—<psf:Option name="ns0000:Tray1" />
   223—<psf:Option name="ns0000:Tray2" />
</psf:Feature>
<psf:Feature name="ns0000:JobGraphicsMode">
       <psf:Option name="ns0000:HPGL2MODE" />    }213
       <psf:Option name="ns0000:RASTERMODE" />
</psf:Feature>
<psf:Feature name="psk:PageOrientation">
       <psf:Option name="psk:Portrait" />        }214
       <psf:Option name="psk:Landscape" />
</psf:Feature>
<psf:Feature name="psk:JobHolePunch">
       <psf:Option name="psk:Top2" />
       <psf:Option name="psk:Left2" />           }215
       <psf:Option name="psk:Right2" />
</psf:Feature>
```

FIG.6

PrintTicket 600

```
<psf:Feature name="ns0000:DriverName">          237
    <psf:Option name="ns0000:PrinterA" />          } 231
</psf:Feature>
<psf:Feature name="psk:PageMediaSize">
    <psf:Option name="psk:ISOA3">
        <psf:ScoredProperty name="psk:MediaSizeWidth">
            <psf:Value xsi:type="xsd:integer">297000</psf:Value>
        </psf:ScoredProperty>                                          } 232
        <psf:ScoredProperty name="psk:MediaSizeHeight">
            <psf:Value xsi:type="xsd:integer">420000</psf:Value>
        </psf:ScoredProperty>
    </psf:Option>                       238
</psf:Feature>
<psf:Feature name="psk:JobInputBin">
    <psf:Option name="ns0000:Tray1" />             } 233
</psf:Feature>
<psf:Feature name="ns0000:JobGraphicsMode">
    <psf:Option name="ns0000:HPGL2MODE" />         } 234
</psf:Feature>
<psf:Feature name="psk:PageOrientation">
    <psf:Option name="psk:Portrait" />             } 235
</psf:Feature>
<psf:Feature name="psk:JobHolePunch">
    <psf:Option name="psk:Top2" />                 } 236
</psf:Feature>
```

FIG.13

UNAVAILABLE FUNCTION

THE FOLLOWING FUNCTION IS NOT INCLUDED IN THIS DRIVER.
THEREFORE, THE FOLLOWING FUNCTION CANNOT BE SET.

Feature: Punch
Option: Top2

```
                                               PrintCapabilities 1400
<psf:Feature name="psk:PageMediaSize">
        <psf:Option name="psk:ISOA6">
                <psf:ScoredProperty name="psk:MediaSizeWidth">
                        <psf:Value xsi:type="xsd:integer">105000</psf:Value>
                </psf:ScoredProperty>
                <psf:ScoredProperty name="psk:MediaSizeHeight">
                        <psf:Value xsi:type="xsd:integer">148000</psf:Value>
                </psf:ScoredProperty>
        </psf:Option>
        <psf:Option name="psk:ISOA3">
                <psf:ScoredProperty name="psk:MediaSizeWidth">
                        <psf:Value xsi:type="xsd:integer">297000</psf:Value>
                </psf:ScoredProperty>
                <psf:ScoredProperty name="psk:MediaSizeHeight">
                        <psf:Value xsi:type="xsd:integer">420000</psf:Value>
                </psf:ScoredProperty>
        </psf:Option>
        <psf:Option name="psk:ISOA4">
                <psf:ScoredProperty name="psk:MediaSizeWidth">
                        <psf:Value xsi:type="xsd:integer">210000</psf:Value>
                </psf:ScoredProperty>
                <psf:ScoredProperty name="psk:MediaSizeHeight">
                        <psf:Value xsi:type="xsd:integer">297000</psf:Value>
                </psf:ScoredProperty>
        </psf:Option>
        <psf:Option name="psk:ISOB4">
                <psf:ScoredProperty name="psk:MediaSizeWidth">
                        <psf:Value xsi:type="xsd:integer">257200</psf:Value>
                </psf:ScoredProperty>
                <psf:ScoredProperty name="psk:MediaSizeHeight">
                        <psf:Value xsi:type="xsd:integer">364100</psf:Value>
                </psf:ScoredProperty>
        </psf:Option>
</psf:Feature>
        <psf:Feature name="psk:JobInputBin">
        <psf:Option name="ns0000:AUTO" />
        <psf:Option name="psk:Manual" />
        <psf:Option name="ns0000:Tray1" />
<psf:Option name="ns0000:Tray2" />
</psf:Feature>
        <psf:Feature name="ns0000:JobGraphicsMode">
        <psf:Option name="ns0000:HPGL2MODE" />
<psf:Option name="ns0000:RASTERMODE" />
</psf:Feature>
        <psf:Feature name="psk:PageOrientation">
        <psf:Option name="psk:Portrait" />
<psf:Option name="psk:Landscape" />
</psf:Feature>
```

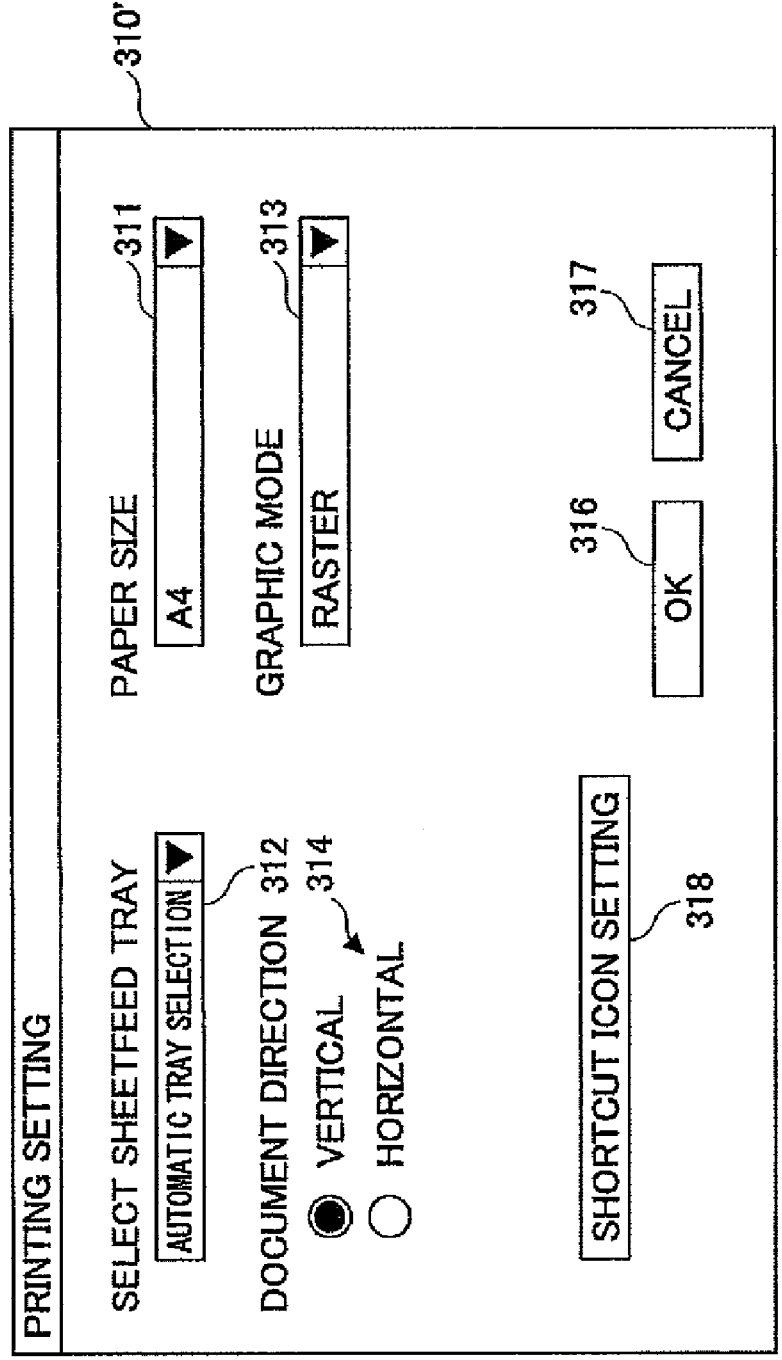

FIG.16

PrintTicket 1600

```
<psf:Feature name="ns0000:DriverName">
    <psf:Option name="ns0000:PrinterB" />    }401
</psf:Feature>
<psf:Feature name="psk:PageMediaSize">
    <psf:Option name="psk:ISOA4">
        <psf:ScoredProperty name="psk:MediaSizeWidth">
            <psf:Value xsi:type="xsd:integer">210000</psf:Value>  ⎫
        </psf:ScoredProperty>                                      ⎬ 402
        <psf:ScoredProperty name="psk:MediaSizeHeight">            ⎪
            <psf:Value xsi:type="xsd:integer">297000</psf:Value>  ⎭
        </psf:ScoredProperty>
    </psf:Option>
</psf:Feature>
<psf:Feature name="psk:JobInputBin">
    <psf:Option name="ns0000:AUTO" />    }403
</psf:Feature>
<psf:Feature name="ns0000:JobGraphicsMode">
    <psf:Option name="ns0000:RASTER" />    }404
</psf:Feature>
<psf:Feature name="psk:PageOrientation">
    <psf:Option name="psk:Portrait" />    }405
</psf:Feature>
```

FIG.19

```
<psf:Feature name="ns0000:DriverName">
    <psf:Option name="ns0000:PrinterB" />
</psf:Feature>
<psf:Feature name="psk:PageMediaSize">
    <psf:Option name="psk:ISOA3">
        <psf:ScoredProperty name="psk:MediaSizeWidth">
            <psf:Value xsi:type="xsd:integer">297000</psf:Value>
        </psf:ScoredProperty>
        <psf:ScoredProperty name="psk:MediaSizeHeight">
            <psf:Value xsi:type="xsd:integer">420000</psf:Value>
        </psf:ScoredProperty>
    </psf:Option>
</psf:Feature>
<psf:Feature name="psk:JobInputBin">
    <psf:Option name=" ns0000:Tray1" />
</psf:Feature>
<psf:Feature name="ns0000:JobGraphicsMode">
    <psf:Option name=" ns0000:HPGL2MODE" />
</psf:Feature>
<psf:Feature name="psk:PageOrientation">
    <psf:Option name="psk:Portrait" />
</psf:Feature>
```
― PrintTicket 1900

FIG.20

```
PrintTicket 2000
<psf:Feature name="ns0000:DriverName">
    <psf:Option name="ns0000:PrinterC" />
</psf:Feature>
<psf:Feature name="psk:PageMediaSize">
    <psf:Option name="psk:ISOA3">
        <psf:ScoredProperty name="psk:MediaSizeWidth">
            <psf:Value xsi:type="xsd:integer">297000</psf:Value>
        </psf:ScoredProperty>
        <psf:ScoredProperty name="psk:MediaSizeHeight">
            <psf:Value xsi:type="xsd:integer">420000</psf:Value>
        </psf:ScoredProperty>
    </psf:Option>
</psf:Feature>
<psf:Feature name="psk:JobInputBin">
    <psf:Option name="ns0000:Tray1" />
</psf:Feature>
<psf:Feature name="ns0000:JobGraphicsMode">
    <psf:Option name="ns0000:HPGL2MODE" />
</psf:Feature>
<psf:Feature name="psk:PageOrientation">
    <psf:Option name="psk:LandScape" />
</psf:Feature>
```

FIG.21

```
<psf:Feature name="ns0000:DriverName">
    <psf:Option name="ns0000:PrinterB" />
</psf:Feature>
<psf:Feature name="psk:PageMediaSize">
    <psf:Option name="psk:ISOA3">
        <psf:ScoredProperty name="psk:MediaSizeWidth">
            <psf:Value xsi:type="xsd:integer">297000</psf:Value>
        </psf:ScoredProperty>
        <psf:ScoredProperty name="psk:MediaSizeHeight">
            <psf:Value xsi:type="xsd:integer">420000</psf:Value>
        </psf:ScoredProperty>
    </psf:Option>
</psf:Feature>
<psf:Feature name="psk:JobInputBin">
    <psf:Option name="ns0000:Tray1" />
</psf:Feature>
<psf:Feature name="ns0000:JobGraphicsMode">
    <psf:Option name="ns0000:HPGL2MODE" />
</psf:Feature>
<psf:Feature name="psk:PageOrientation">
    <psf:Option name="psk:Landscape" />
</psf:Feature>
```
PrintTicket 2100

FIG.22

```
PrintTicket 2200

<psf:Feature name="ns0000:DriverName">
    <psf:Option name="ns0000:PrinterA" />
</psf:Feature>
<psf:Feature name="psk:PageMediaSize">
    <psf:Option name="psk:ISOA3">
        <psf:ScoredProperty name="psk:MediaSizeWidth">
            <psf:Value xsi:type="xsd:integer">297000</psf:Value>
        </psf:ScoredProperty>
        <psf:ScoredProperty name="psk:MediaSizeHeight">
            <psf:Value xsi:type="xsd:integer">420000</psf:Value>
        </psf:ScoredProperty>
    </psf:Option>
</psf:Feature>
<psf:Feature name="psk:JobInputBin">
    <psf:Option name="ns0000:Tray1" />
</psf:Feature>
<psf:Feature name="ns0000:JobGraphicsMode">
    <psf:Option name="ns0000:HPGL2MODE" />
</psf:Feature>
<psf:Feature name="psk:PageOrientation">
    <psf:Option name="psk:Landscape" />
</psf:Feature>
<psf:Feature name="psk:JobHolePunch">
    <psf:Option name="psk:Top2" />
</psf:Feature>
```

FIG.23

EXCLUSIVE SETTING DATA 2300

*InvalidCombination: LIST(InputBin.Tray1, PaperSize.A3)
*InvalidCombination: LIST(InputBin.Tray1, PaperSize.A6)
*InvalidCombination: LIST(InputBin.Tray1, PaperSize.B4)

FIG.25

EXCLUSIVE SETTING

THE FOLLOWING FUNCTION CANNOT BE SET
SINCE THE FUNCTION IS EXCLUDED.

Feature: PaperSize
Option: A3

Feature: InputBin
Option: Tray1

```
<psf:Feature name="ns0000:DriverName">
    <psf:Option name="ns0000:PrinterA" />
</psf:Feature>
<psf:Feature name="psk:PageMediaSize">
    <psf:Option name="psk:ISOA3">
        <psf:ScoredProperty name="psk:MediaSizeWidth">
            <psf:Value xsi:type="xsd:integer">297000</psf:Value>
        </psf:ScoredProperty>
        <psf:ScoredProperty name="psk:MediaSizeHeight">
            <psf:Value xsi:type="xsd:integer">420000</psf:Value>
        </psf:ScoredProperty>
    </psf:Option>
</psf:Feature>
<psf:Feature name="psk:JobInputBin">
    <psf:Option name="ns0000:Tray1" />
</psf:Feature>
<psf:Feature name="ns0000:JobGraphicsMode">
    <psf:Option name="ns0000:HPGL2MODE" />
</psf:Feature>
<psf:Feature name="psk:PageOrientation">
    <psf:Option name="psk:Portrait" />
</psf:Feature>
<psf:Feature name="psk:JobHolePunch">
    <psf:Option name="psk:Top2" />
</psf:Feature>
```

PrintTicket 2600

FIG.27

```
PrintTicket 2700

<psf:Feature name="ns0000:DriverName">
  <psf:Option name="ns0000:PrinterB" />
</psf:Feature>
<psf:Feature name="psk:PageMediaSize">
  <psf:Option name="psk:ISOA3">
    <psf:ScoredProperty name="psk:MediaSizeWidth">
      <psf:Value xsi:type="xsd:integer">297000</psf:Value>
    </psf:ScoredProperty>
    <psf:ScoredProperty name="psk:MediaSizeHeight">
      <psf:Value xsi:type="xsd:integer">420000</psf:Value>
    </psf:ScoredProperty>
  </psf:Option>
</psf:Feature>
<psf:Feature name="psk:JobInputBin">
  <psf:Option name="ns0000:Tray1" />
</psf:Feature>
<psf:Feature name="ns0000:JobGraphicsMode">
  <psf:Option name="ns0000:HPGL2MODE" />
</psf:Feature>
<psf:Feature name="psk:PageOrientation">
  <psf:Option name="psk:Portrait" />
</psf:Feature>
```

FIG.28

PrintTicket 2800

```
<psf:Feature name="ns0000:DriverName">
    <psf:Option name="ns0000:PrinterB" />
</psf:Feature>
<psf:Feature name="psk:PageMediaSize">
    <psf:Option name="psk:ISOA4">
        <psf:ScoredProperty name="psk:MediaSizeWidth">
            <psf:Value xsi:type="xsd:integer">210000</psf:Value>
        </psf:ScoredProperty>
        <psf:ScoredProperty name="psk:MediaSizeHeight">
            <psf:Value xsi:type="xsd:integer">297000</psf:Value>
        </psf:ScoredProperty>
    </psf:Option>
</psf:Feature>
<psf:Feature name="psk:JobInputBin">
    <psf:Option name="ns0000:AUTO" />
</psf:Feature>
<psf:Feature name="ns0000:JobGraphicsMode">
    <psf:Option name="ns0000: HPGL2MODE" />
</psf:Feature>
<psf:Feature name="psk:PageOrientation">
    <psf:Option name="psk:Portrait" />
</psf:Feature>
```

APPARATUS AND METHOD FOR CONTROLLING A DEVICE WITH A DEVICE DRIVER

BACKGROUND OF THE INVENTION

1. Field of the Invention

The present invention relates to a data processing apparatus, a device controlling method, and a computer-readable recording medium.

2. Description of the Related Art

In recent years, in a case of controlling a device(s) with a computer, a function of a device driver is performed by executing a device driver program for controlling the device in the operating system (OS). In such a case, when the user instructs a device to perform some kind of operation by executing various application programs such as word processing software, spreadsheet software, image editing software (hereinafter simply referred to as an "application"), the application delivers the instruction to the device driver (process of device driver). Then, the device driver, receiving the instruction, controls the device according to the instruction.

For example, in a case of controlling a printer to perform a printing operation, an application, upon accepting an instruction by the user to print a document created or browsed by using various applications (e.g. word processing software, spreadsheet software, image editing software), delivers the data of the document to a printer driver in accordance with the instruction. Then, the printer driver delivers the data of the document to the printer, to thereby execute printing of the document.

The application may also have a function of accepting instructions of settings regarding a wide variety of printing functions (e.g., integration, bookbinding, scaling, finishing) of the printer when accepting the printing instruction. Therefore, printer drivers may be equipped with a function for accepting combinations of various settings (printing functions) requested by the user so that a printing target fulfilling the needs of the user can be obtained.

In order to make the combination of the functions easier to understand, recent printer drivers use graphic symbols such as icons and thumbnails to visualize each of the functions. This makes it easier for the user to set the printing functions. The functions include, for example, a function for displaying an icon showing an actual output result showing how a printing target is output depending on the settings of the printing function or a function referred to as a one click function for displaying a setting having plural combinations of printing functions on a single icons. Because various settings for a printing operation are indicated in a single icon and registered in a printer driver, the settings of the combinations of printing functions, which must ordinarily be conducted plural times, needs only be conducted once by clicking the icon a single time. This function is proposed by various printer vendors such as in Japanese Laid-Open Patent Application Nos. 2000-227849, 2002-182871, 2000-137589, 2000-112683, and 11-149362.

Furthermore, Microsoft Corporation proposes a printing supporting function with Microsoft Windows Vista (Trademark) in which the content of the printing setting is described as "PrintTicket" with a structured language XML (Extensible Markup Language) format and data indicating capabilities of a printer are described as a "PrintCapabilities" as an XML document (see "PrintTicket and PrintCapabilities Support in Windows Print Drivers", [online], Feb. 6, 2006, Microsoft Corporation, retrieved from the Internet on Jul. 11, 2007, <URL: http://download.microsoft.com/download/9/c/5/9c5b2167-8017-4bae-9fde-d599bac8184a/XPSDrV_PrintTicket.doc>, hereinafter referred to as "non-patent document").

In a case where an operating system (OS) such as Microsoft Windows (Registered Trademark) 2000 or XP is used, the contents of the settings for printing a printing target (document) are stored in a structure referred to as "DEVMODE". The contents of the settings are input from the application to the printer driver via a graphic engine of the OS. When using the one click function where a discretionary combination of settings is registered beforehand in the DEVMODE structure and a corresponding icon is selected, the DEVMODE structure corresponding to the selected icon is readout and used for printing.

Furthermore, the DEVMODE structure has a public area defined by the OS and a private area that can be discretionarily defined by the vendor of a printer driver. For example, with the above-described one click function, the public area stores contents common among the printer driver vendors (e.g., paper size, orientation of paper) and the private area stores functions unique to the printer vendors.

However, with the DEVMODE structure, the printing settings stored in the private area can only be recognized by the printer driver that registered the printing settings. Therefore, even if the settings registered in the DEVMODE structure by one printer driver are desired to be used by another printer driver, the other printer driver cannot use the DEVMODE structure because the other printer driver is unable to recognize the content stored in the private area of the DEVMODE structure. Thus, in order for the DEVMODE structure to be used by the other printer driver, the same settings have to be registered by the other printer driver. This process may be inconvenient for the user.

This problem may also occur in a case where the control target is a device other than a printer.

In the non-patent document, there is no description teaching how to resolve this problem by using the PrintTicket or the PrintCapabilities.

SUMMARY OF THE INVENTION

The present invention may provide a data processing apparatus, a device controlling method, and a computer-readable recording medium that substantially eliminates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing apparatus, a device controlling method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing apparatus including a device driver part for controlling a device, including: a storing part configured to store device capability data; a receiving part configured to receive a designation of a PrintTicket having setting data indicating control settings used for controlling the device; a determining part configured to determine whether the designated PrintTicket has been fabricated by the device driver part or another device driver part; a first controlling part configured to apply all of the setting data to the control settings in a case where the designated PrintTicket is determined to be fabricated by the device driver part; and a second controlling part configured to compare the device capability data with the setting data and apply at least a part of the setting data to the control settings in a case where the designated PrintTicket is determined to be fabricated by the other device driver part.

Another embodiment of the present invention provides a device controlling method for causing a device driver part to control a device, the method including the steps of: a) storing device capability data; b) receiving a designation of a PrintTicket having setting data indicating control settings used for controlling the device; c) determining whether the designated PrintTicket has been fabricated by the device driver part or another device driver part; d) applying all of the setting data to the control settings in a case where the designated PrintTicket is determined to be fabricated by the device driver part; and e) comparing the device capability data with the setting data and applying at least a part of the setting data to the control settings in a case where the designated PrintTicket is determined to be fabricated by the other device driver part.

Another embodiment of the present invention provides a computer-readable recording medium on which a program is recorded for causing a computer including a device driver part to execute a method of controlling a device, the method including the steps of: a) storing device capability data; b) receiving a designation of a PrintTicket having setting data indicating control settings used for controlling the device; c) determining whether the designated PrintTicket has been fabricated by the device driver part or another device driver part; d) applying all of the setting data to the control settings in a case where the designated PrintTicket is determined to be fabricated by the device driver part; and e) comparing the device capability data with the setting data and applying at least a part of the setting data to the control settings in a case where the designated PrintTicket is determined to be fabricated by the other device driver part.

Other objects, features and advantages of the present invention will become more apparent from the following detailed description when read in conjunction with the accompanying drawings.

BRIEF DESCRIPTION OF THE DRAWINGS

FIG. 5 is a schematic diagram for describing the content of PrintCapabilities included in a printer driver A shown in FIG. 4 according to an embodiment of the present invention;

FIG. 6 is a schematic diagram for describing an example of a PrintTicket fabricated by the printer driver A shown in FIG. 4;

FIG. 13 is a schematic diagram showing a message indicating data of an unavailable function displayed in Step S36 of FIG. 11 according to an embodiment of the present invention;

FIG. 14 is a schematic diagram for describing the content of PrintCapabilities included in a printer driver B shown in FIG. 4 according to an embodiment of the present invention;

FIG. 15 is a schematic diagram showing an example of a printing setting screen used for the printer driver shown in FIG. 4;

FIG. 16 is a schematic diagram showing a default PrintTicket indicating data of initial values of printing settings of the printer driver B shown in FIG. 4 according to an embodiment of the present invention;

FIG. 19 is a schematic diagram showing a printing-use PrintTicket fabricated by the printer driver B shown in FIG. 4 as a result of applying the PrintTicket shown in FIG. 6 according to an embodiment of the present invention;

FIG. 20 is a schematic diagram showing an example of a PrintTicket to be applied to a printing-use PrintTicket according to an embodiment of the present invention;

FIG. 21 is a schematic diagram showing a printing-use PrintTicket fabricated by the printer driver B shown in FIG. 4 as a result of applying the PrintTicket shown in FIG. 20 according to an embodiment of the present invention;

FIG. 22 is a schematic diagram showing a printing-use PrintTicket fabricated by the printer driver A shown in FIG. 4 as a result of applying the PrintTicket shown in FIG. 20 according to an embodiment of the present invention;

FIG. 23 is a schematic diagram showing an example of exclusive setting data according to an embodiment of the present invention;

FIG. 25 is schematic diagram showing an example of data of an exclusive setting displayed in Step S62 of FIG. 24;

FIG. 26 is a schematic diagram showing an example of a PrintTicket to be applied to a printing-use PrintTicket by the printer driver B shown in FIG. 4 according to an embodiment of the present invention;

FIG. 27 is a schematic diagram showing an example of a PrintTicket fabricated by the printer driver B shown in FIG. 4 as a result of applying the PrintTicket shown in FIG. 21 before performing an exclusive control operation according to an embodiment of the present invention;

FIG. 28 is a schematic diagram showing an example of a PrintTicket fabricated by the printer driver B shown in FIG. 4 as a result of applying the PrintTicket shown in FIG. 21 after performing an exclusive control operation according to an embodiment of the present invention.

DETAILED DESCRIPTION OF THE PREFERRED EMBODIMENTS

In the following, embodiments of the present invention are described with reference to the accompanying drawings.

First Example

FIGS. 1-22, 29

Figure 29:
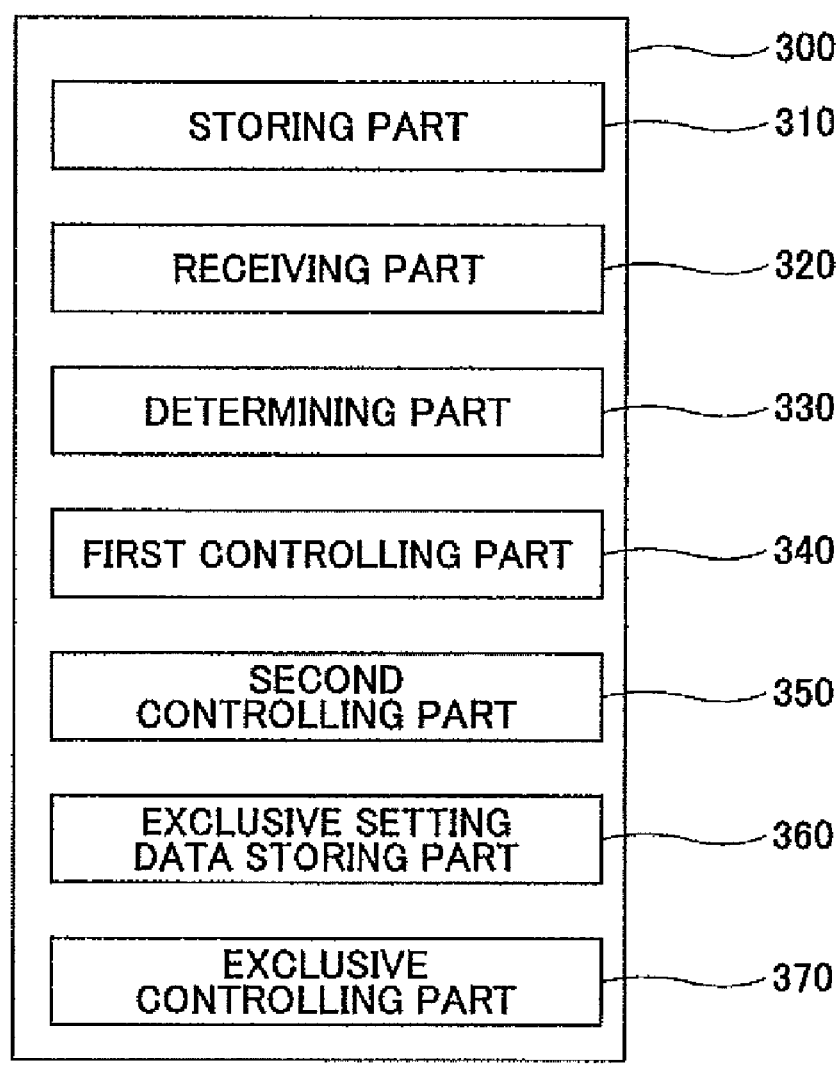
FIG. 29 is a schematic diagram showing a data processing apparatus having a device driver part according to an embodiment of the present invention.

An exemplary configuration of a printing system 1 including data processing apparatuses 10a-10c (also indicated with reference numeral "10" when there is no need to distinguish the data processing apparatuses) and devices 20a, 20b (also indicated with reference numeral "20" when there is no need to distinguish the devices 20a, 20b) controlled by the data processing apparatuses 10a-10c is described with reference to FIG. 1. In this example, the data processing apparatuses 10a-10c are personal computers (PCs). Furthermore, the devices 20a, 20b controlled by the PCs 10a-10c are printers. The printer 20 according to an embodiment of the present invention is an image forming apparatus configured to form an image on a paper according to a printing request from the PC 10. FIG. 29 shows an example of the data processing apparatus 10 having a device driver part 300 including a storing part 310, a receiving part 320, a determining part 330, a first controlling part 340, and a second controlling part 350. Furthermore, the device driver part 300 of the data processing apparatus 10 may also include an exclusive setting data storing part 360 and an exclusive controlling part 370 (see below-described modified example).

Figure 1:
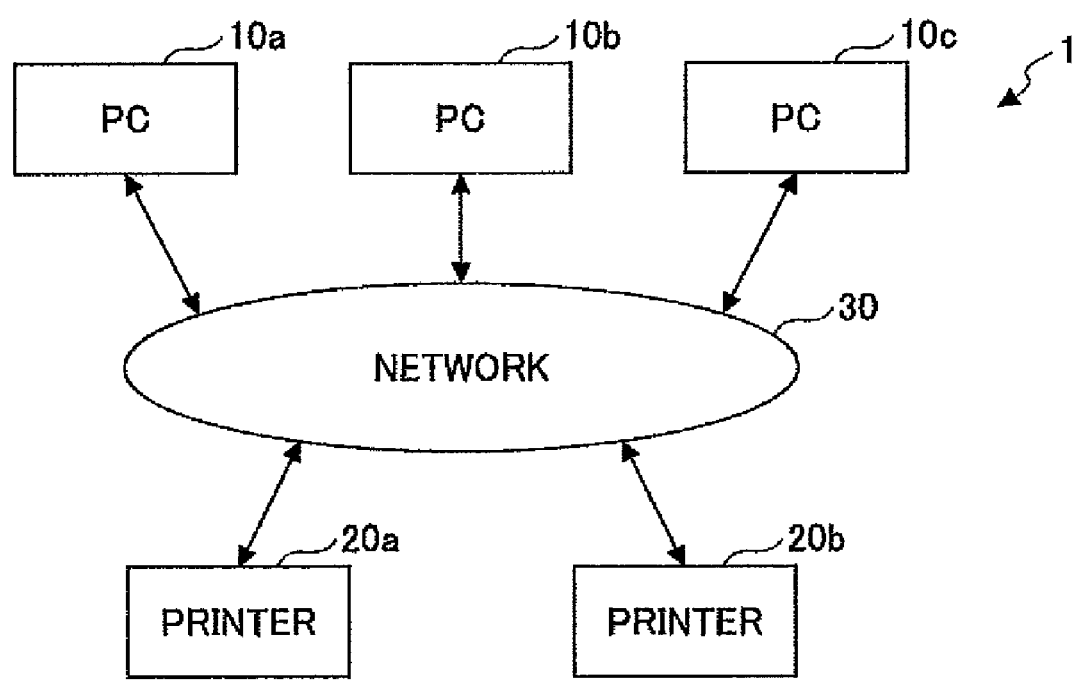
FIG. 1 is a schematic diagram showing a configuration of a printing system including data processing apparatuses and devices controlled by the data processing apparatuses according to an embodiment of the present invention.

As shown in FIG. 1, the printing system 1 has PCs 10a-10c and printers 20a, 20b connected by a network 30. The network 30 is not limited to using a particular communications path. The network 30 may be, for example, a local area network (LAN) and may be a wire network or a wireless network.

Figure 2:
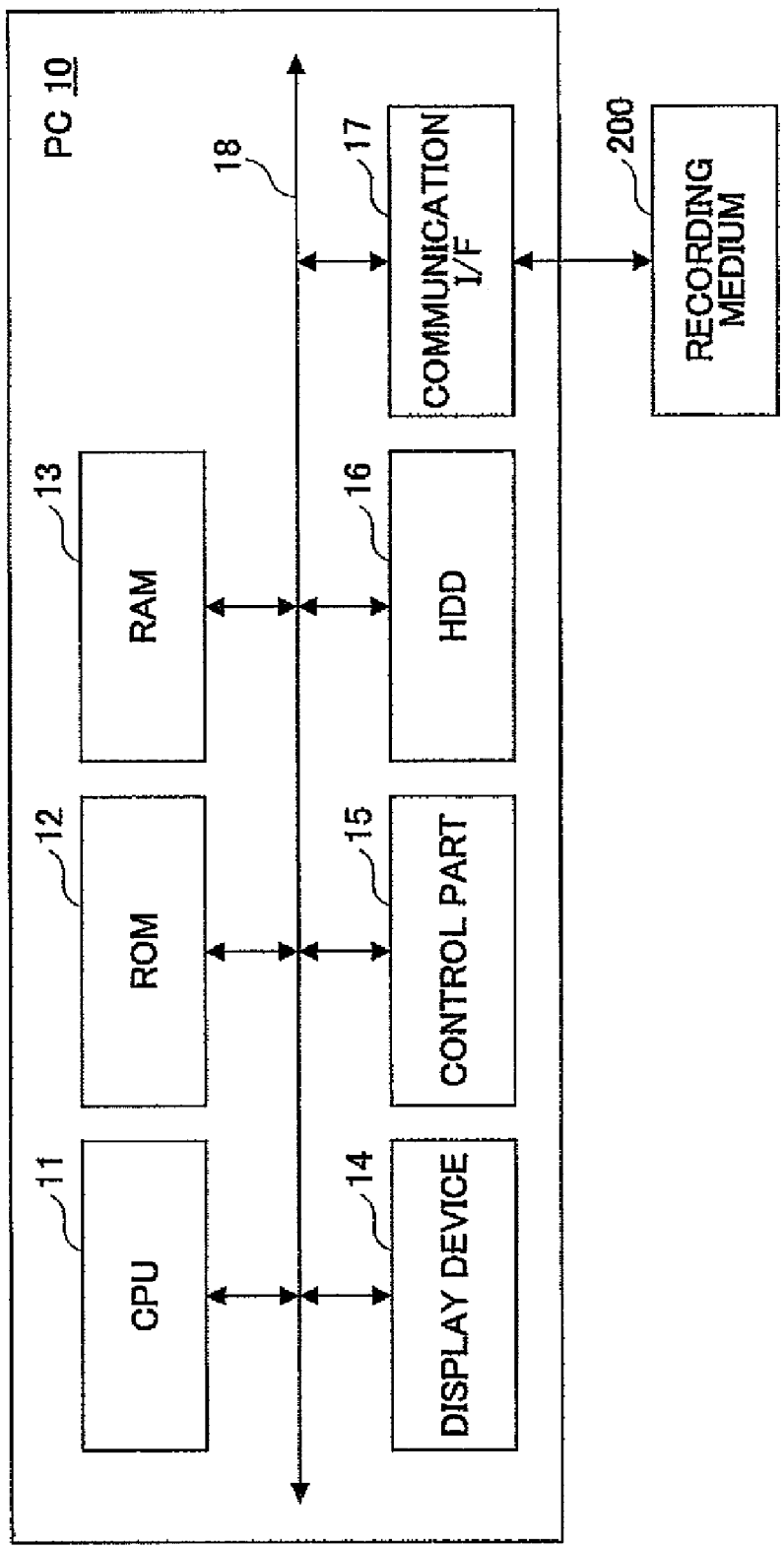
FIG. 2 is a schematic diagram showing a hardware configuration of a data processing apparatus according to an embodiment of the present invention.

A hardware configuration of the PC 10 is shown in FIG. 2.

As shown in FIG. 2, the PC 10 includes, for example, a CPU 11, a ROM 12, a RAM 13, a display device 14, a control part 15, a HDD (hard disk drive) 16, and a communication interface (I/F) 17 that are connected by a system bus 18. The display device 14 is, for example, a liquid crystal display. The control part 15 is, for example, a mouse or a keyboard. The display device 14 or the control part 15 may be an external display device or an external control device.

In the PC 10, a function(s) of the printer driver (device driver part) that controls the printer 20 is performed by operating a program (in this example, printer driver program) stored in the ROM 12 or the HDD 16 on the OS executed by the CPU 11. The program may be installed in the PC 10 from a recording medium 200.

The controlling of the printer 20 is not only performed by exchanging (transmitting/receiving) data between the PC 10 and the printer 20 but also includes various processes performed for causing the printer 20 to execute a printing operation based on data of a printing target. For example, the printer may be controlled by a process of converting an internal command of the OS to a language comprehensible for the printer 20 and generating printing data described with PDL (Page Description Language).

In this example, Microsoft Windows Vista (Trademark) is used as the OS. By using a platform provided by the OS, the content of various printing settings sent from the printer driver to the printer 20 can be described as a PrintTicket. The PrintTicket is an XML document indicating the settings selected from the capabilities of the printer 20 (e.g., size of paper "A4"). Because the format of the PrintTicket is basically defined by Microsoft Corporation (supplier of the OS), the PrintTicket may be considered as printing setting data having the contents of the printing settings of the printer 20 described in a PrintTicket format.

Furthermore, the capabilities of the printer 20 (i.e. control target of the printer driver) can be described as PrintCapabilities which is also an XML document. Because the format of the PrintCapabilities is also basically defined by Microsoft Corporation, the PrintCapabilities may be considered as device capability data having the contents of the functions of the device (printer) 20 described in a PrintCapabilities format.

Furthermore, the printer 20 also includes hardware such as a CPU, a ROM, a RAM, a communication I/F, a control panel, and a printing engine (not shown). The printer 20 is configured to receive a printing command including printing data from the printer driver and print an image indicated in the printing data (printing function) based on the settings described in the PrintTicket attached to the printing date according to the printing command. The printer 20 may be configured as an MFP (digital multifunction machine) having a scanning function, a facsimile communicating function, and a document storing function.

There is no particular limit regarding the number of PCs 10 and printers 20 included in the printing system 1 according to an embodiment of the present invention.

Next, an exemplary configuration of parts of the PC 10 corresponding to the functions of the PC 10 is described with reference to FIG. 3.

Figure 3:
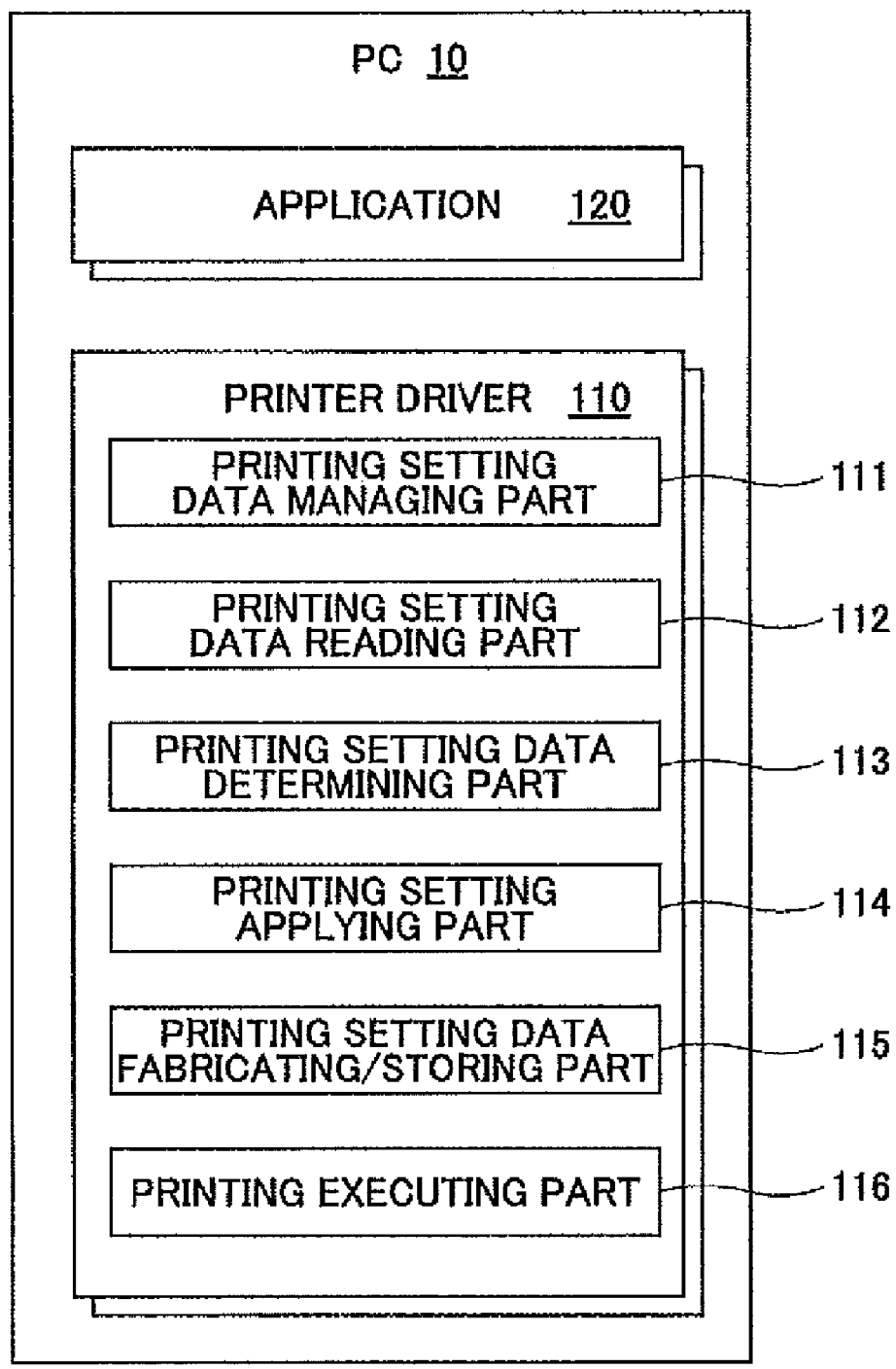
FIG. 3 is a block diagram showing parts of a data processing apparatus configured to execute functions of the data processing apparatus according to an embodiment of the present invention.

As shown in FIG. 3, the PC 10 includes functions of a printer driver 110 that are performed by the above-described printer driver program and functions of an application 120 that are performed by various application programs (e.g., word processing software, spreadsheet software, image editing software). Furthermore, plural printer drivers 110 and applications 120 may provided in a single PC 10.

The application 120 has a function of fabricating data of, for example, documents and images according to controls of the user and functions of activating the printer driver 110, delivering the fabricated data to the printer driver 110, and causing the printer driver 110 to execute processes necessary for printing according to printing instructions from the user.

The printer driver 110 includes, for example, a printing setting data managing part 111, a printing setting data reading part 112, a printing setting data detecting part 113, a printing setting changing part 114, a printing setting data fabricating/storing part 115, and a printing executing part 116.

The printing setting data managing part 111 has a function of managing a storage location of a PrintTicket fabricated by the user by using the functions of the printer driver 10. The printing setting data managing part 111 also has a function of providing data of the storage location in response to an inquiry from another printer driver and a function of storing a storage address of a PrintTicket fabricated by another printer driver in a storage area.

The printing setting data reading part 112 has a function of reading a PrintTicket designated by the user from the storage area managed by the printing setting data managing part 111 and a function of confirming the format of the PrintTicket. The printing data setting data reading part 112 may also have a function of reading printing setting data registered in a DEVMODE structure or other formats and converting the read printing setting data into a PrintTicket format.

The printing setting data determining part 113 has a function of analyzing the content of the PrintTicket read by the printing setting data reading part 112 and determining whether the data described in the PrintTicket are within the functions of the printer (control target) 20 of the printer driver 110 itself. The data of the functions of the printer (control target) 20 are stored as a PrintCapabilities file in a predetermined folder.

The printing setting applying part 114 has a function of applying and modifying the content of the PrintTicket to be transmitted to the printer 20 when executing a printing operation (printing-use PrintTicket) in accordance with the content of the PrintTicket read out by the printing setting reading part 112. In a case where the content of the read out PrintTicket has been fabricated by the printer driver 110 itself, the entire content of the settings described in the read out PrintTicket is applied to the content of the printing-use PrintTicket. In a case where the content of the read out PrintTicket has been fabricated by another printer driver 110, only a part of the content of the read out PrintTicket determined to be within the functions of the printer (control target) 20 is applied to the content of the printing-use PrintTicket.

The printing setting data fabricating/storing part 115 has a function of receiving an instruction to set printing settings from a GUI (as described below with reference to FIG. 7) and fabricating the printing-use PrintTicket according to the content of the printing settings received from the user. The printing-use PrintTicket fabricated according to the content of the printing settings received from the user may have the content of the read out PrintTicket applied by the printing setting applying part 114 afterward. Alternatively, the content of the read out PrintTicket may be applied to the content of the printing-use PrintTicket by the printing setting applying part 114 and then the content of the printing-use PrintTicket may be partly or entirely modified according to the content of the printing settings received from the user.

Furthermore, the printing setting data fabricating/storing part 115 also has a function of storing the fabricated printing-use PrintTicket or the printing-use PrintTicket having the content of the read out PrintTicket applied by the printing setting applying part 114.

The printing executing part 116 has a function of receiving data indicating the content of the document to be printed from the application 120, converting the received data to printing data described in a printer language comprehensible for the printer (control target) 20, generating a printing command including the print-use PrintTicket attached to the converted printing data, and transmitting the printing command to the printer 20. Thereby, the printing operation can be executed by the printer 20.

Next, storing PrintTickets by the PC 10 is described with reference to FIG. 4.

According to an embodiment of the present invention, one or more printing setting data storage folders (in this embodiment, printing setting data storage folders A and B) are provided in the PC 10 in correspondence with each printer driver 110 (in this embodiment, printer drivers A and B) in the PC 10. Each printing setting data storage folder A, B includes one or more PrintTickets (in this embodiment, PrintTickets P, Q, R, S, T) fabricated by a corresponding printer driver A, B. More specifically, the PrintTicket P, Q, R, S, T fabricated by the corresponding printer driver A, B is stored in the printing setting data storage folder A, B by the printing setting data fabricating/storing part 115 of the printer driver A, B. Although the stored PrintTickets P, Q, R, S, T are basically read out from the printing setting data storage folders A, B by corresponding printer drivers A, B, a PrintTicket stored in a printing setting data storage folder of another printer driver can also be read out as illustrated with broken lines in FIG. 4. The location of a desired PrintTicket can be obtained, for example, by querying the printing setting data managing part 111 of the other printer driver or searching through files based on an extension of a file name of the desired PrintTicket.

Throughout the description of the embodiments of the present invention, the printer driver used for controlling the printer 20a is referred to as "printer driver A" and the printer driver used for controlling the printer 20b is referred to as "printer driver B". Furthermore, throughout the description of the embodiments of the present invention, a printer subjected to controls of the printer driver may also be referred to as "target printer" or "control target".

Next, the content of PrintCapabilities 500 included in the printer driver A of PC 10 according to an embodiment of the present invention is described with reference to FIG. 5.

The PrintCapabilities 500 indicates the content of the functions included in the printer 20a controlled by the printer driver A. The PrintCapabilities 500 illustrated in FIG. 5 shows only a portion of data of the functions of the printer 20a for the sake of convenience. More functions (data) are included in the actual PrintCapabilities as well as other actual PrintCapabilities and PrintTickets described throughout the description of the embodiments of the present invention.

Although the PrintCapabilities 500 may be stored beforehand in a predetermined storing part (e.g., HDD, ROM) of the PC 10, the PrintCapabilities may be obtained by accessing the printer (control target) 20a upon activation of the printer driver A or periodically after the activation of the printer driver A.

In each element shown in the PrintCapabilities 500 of FIG. 5, the uppermost feature element indicates a unit of a function. The "name" attribute indicates an identifier of a function. In FIG. 5, five feature elements 211-215 show that the printer 20a has five functions "PageMediaSize" (paper size), "JobInputBin" (sheetfeed tray), "JobGraphicsMode" (graphic mode), "PageOrientation" (document direction), and "JobHolePunch" (hole punching).

Furthermore, each feature element has a subordinate element referred to as an option element. The option element indicates a choice that can be set (selected) with respect to the function of the feature element corresponding to the option element. For example, the feature element 211 corresponding to "PageMediaSize" (feature element having the "name" attribute "PageMediaSize") has four option elements 216-219. The four option elements 216-219 indicate selectable choices "ISOA6" (A6), "ISOA3" (A3), "ISOA4" (A4), and "ISOB4" (B4). The feature element 212 corresponding to "JobInputBin" (feature element having the "name" attribute "JobInputBin") has four option elements 220-223. The four option elements 220-223 indicate selectable choices "AUTO" (automatic tray selection), "MANUAL" (manual sheetfeed tray), "Tray 1" (Tray 1), and "Tray 2" (Tray 2).

Some feature elements require setting other items when a function corresponding to the feature element is selected. For example, in a case where the paper size is selected, there is a need to set the width and height of the selected paper. More specifically, the feature element 211 corresponding to "PageMediaSize" has option elements 216-219. Each option element 216-219 has further subordinate elements "ScoredProperty" elements 224, 225. When the option element 216-219 is selected, it is necessary to set a value element into a predetermined item. For example, in a case where "ISOA6" is selected as "PageMediaSize", a value element 226 indicating "105000" is set in the item "MediaSizeWidth" and another value element 227 indicating "148000" is set in the item "MediaSizeHeight".

Next, an example of a PrintTicket 600 fabricated by the printer driver A is described with reference to FIG. 6.

The PrintTicket 600 indicates the content of the settings to be used when the printer driver A requests the printer 20a to perform a printing operation.

In FIG. 6, a feature element 231 provided at the top of the PrintTicket 600 indicates identification data of the printer driver A. The feature element 231 has an option element 237. In the PrintTicket 600, the identification data of the printer driver A is indicated in a "name" attribute of an option element 237, that is, a subordinate element of the feature element 231. In FIG. 6, the identification data of the printer driver is indicated as "PrinterA".

The feature elements 232-236 following the feature element 231 indicate the choices to be set in correspondence with the functions indicated by the feature elements 211-215 of the PrintCapabilities 500 of printer driver A. The subordinate elements of the feature elements 232-236 indicate a single option element (choice) selected from corresponding option elements in the PrintCapabilities 500. For example, an option element 238 of the feature element 233 indicates that Tray 1 is to be set as the sheetfeed tray.

Although the PrintTicket 600 includes various data such as data to be read out when requested by the user, data indicating a default format, or data to be transmitted to the printer 20a together with printing data (printing-use PrintTicket) to be transmitted to the printer 20a, the format of the data is the same.

Figure 7:
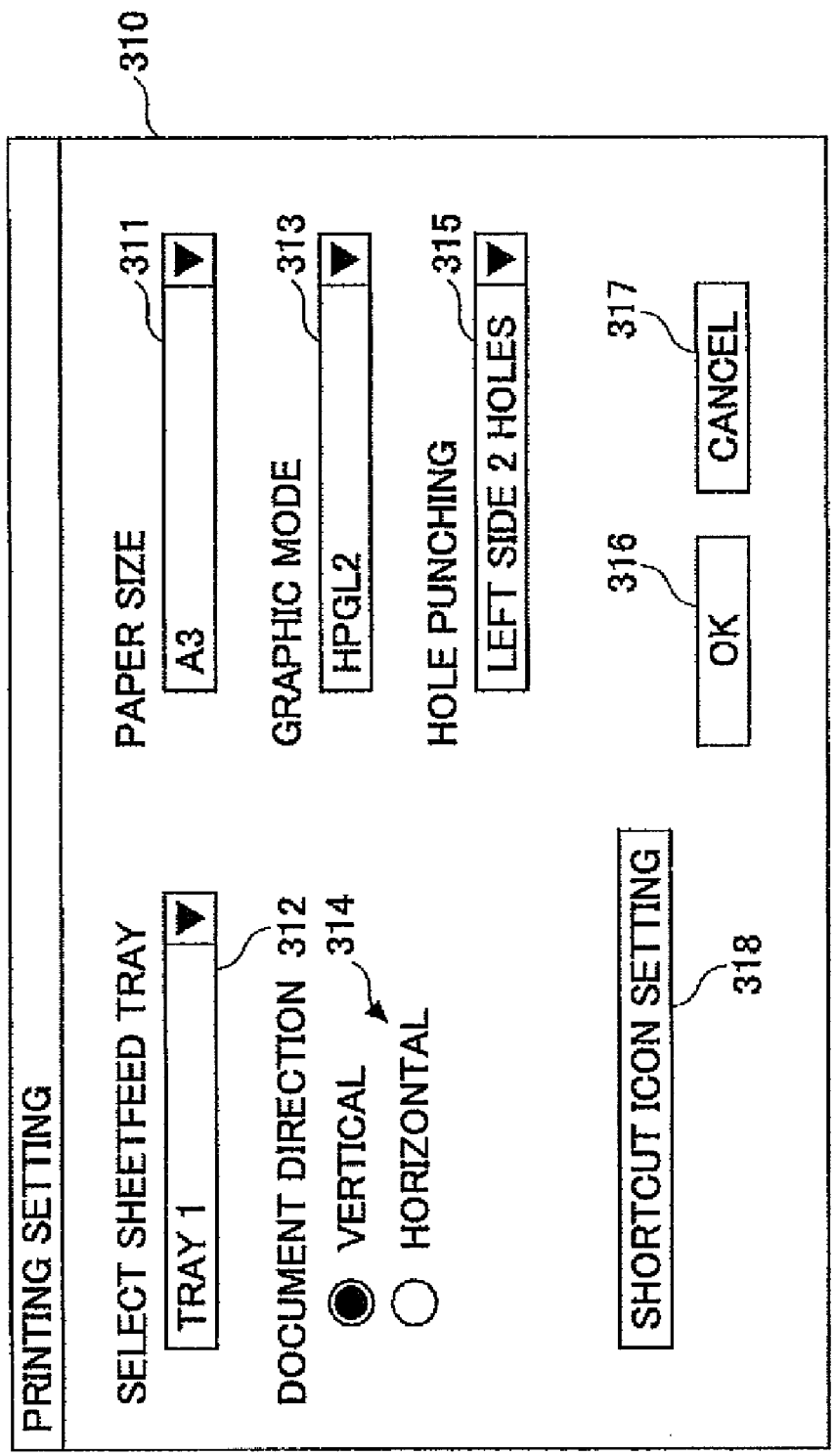
FIG. 7 is a schematic diagram showing an example of a printing setting screen used for the printer driver A shown in FIG. 4.

Next, an example of a GUI (Graphic User Interface) screen for enabling the printer driver 110 to receive instructions regarding printing settings from the user is described with reference to FIG. 7. Although the GUI screen may differ depending on printer drivers, the screen shown in FIG. 7 is a GUI screen used by the printer driver A and is also referred to as a printing setting screen 310. The printing setting screen 310 is for receiving instructions regarding values to be set in the functions of the printer 20a from the user. Accordingly, the printing setting screen 310 includes selecting parts 311-315 corresponding to the feature elements 211-215 in the PrintCapabilities 500 shown in FIG. 5. Thereby, the choices of the option elements of the feature elements 211-215, that is, items corresponding to the paper size, the sheetfeed tray, the graphic mode, and the document direction, and the hole punching can be selected.

The initial values to be set in the selecting parts 311-315 are determined according to the content of a default PrintTicket stored by the printer driver A. In displaying the printing setting screen 310, the printer driver 110 may copy the default PrintTicket, attach the default PrintTicket to printing data, and fabricate a printing-use PrintTicket. Then, the content of the printing-use PrintTicket may be modified whenever one of the choices in the selecting parts 311-315 is changed.

In FIG. 7, the OK button 316 is for receiving an instruction to execute a printing operation based on the settings of the selecting parts 311-315, and the cancel button 317 is for receiving an instruction to cancel a printing operation and return to a previous screen.

It is to be noted that the data indicated in the printing setting screen 310 do not need to be fabricated based on the PrintCapabilities 500 but may also be based on data independent of the PrintCapabilities.

The printing setting screen 310 also includes a shortcut icon setting button 318 for receiving an instruction to display a shortcut icon managing screen 330 (described in detail below) from the user.

Next, an example of the shortcut icon managing screen 330 is described with reference to FIG. 8.

The shortcut icon managing screen 330 includes an icon displaying part 331, a setting content displaying part 333, a setting registering part 334, a calling of shortcut setting icon 335, and a close button 336.

The icon displaying part 331 is for displaying a list of printing settings registered in the printing setting data storage folder and receiving selection of printing settings desired to be used for a printing operation. A name and an icon showing the content of a format used when performing the printing operation are displayed in correspondence with each printing setting, so that the user can easily understand the content of each printing settings. The content of each printing setting is registered as a PrintTicket in the printing setting data storage folder.

Various known methods may be used for fabricating the icons corresponding to the printing settings. Other graphic symbols may be used instead of the icon. For example, a thumbnail image schematically showing printing data printed on a document according to a corresponding printing setting may be used.

The user can select an icon by making a single click on the icon. When an icon is selected, the selection of the icon is indicated by a cursor 332 and the printing setting corresponding to the selected icon is indicated in the setting content displaying part 333.

Furthermore, by double-clicking an icon, the user can select a printing setting corresponding to the double-clicked icon and have the selected printing setting applied to the content of the printing setting screen 310 shown in FIG. 7. In this case, the printer driver 110 reads out a PrintTicket including the selected printing setting from the printing setting data storage folder and applies the content of the read out PrintTicket to a printing-use PrintTicket.

Figure 4:
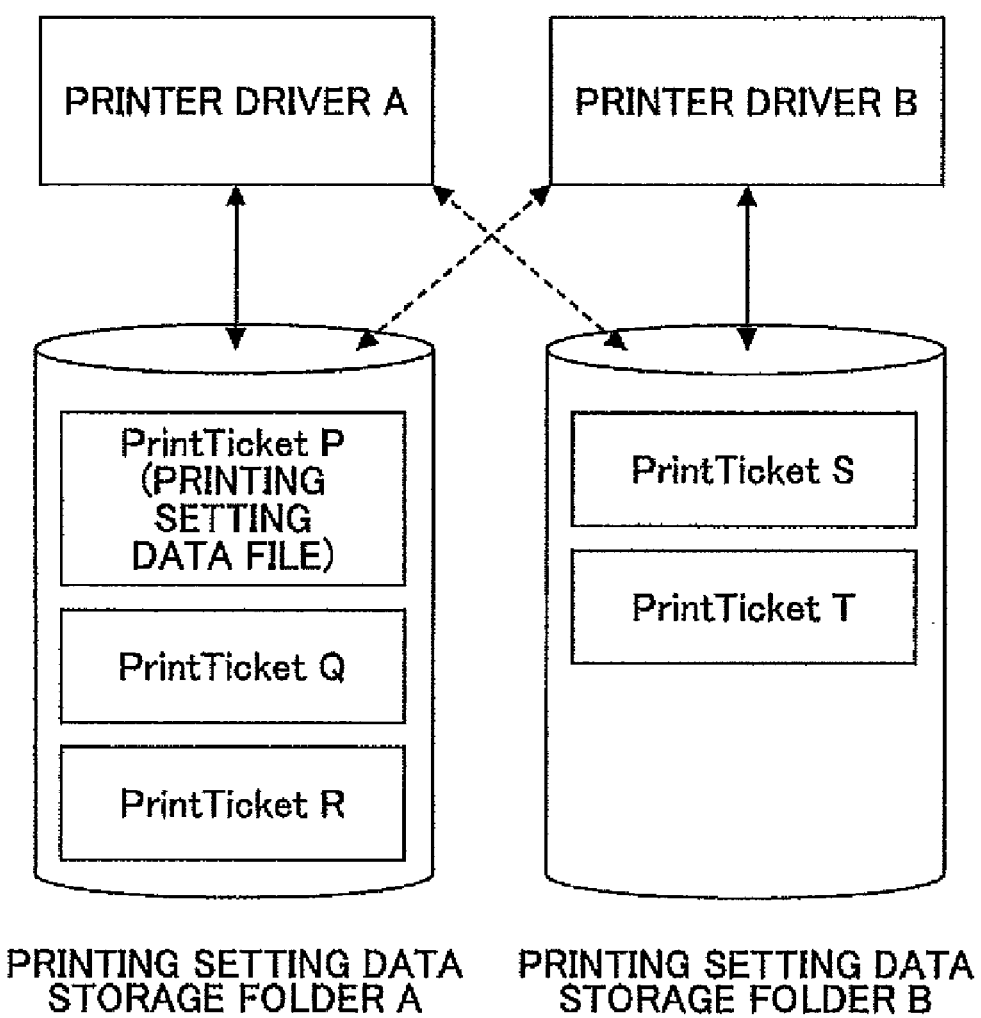
FIG. 4 is a schematic diagram showing storage of PrintTickets of a data processing apparatus according to an embodiment of the present invention.

For example, as shown in FIG. 4, the printer driver A may read out of a PrintTicket from a printing setting data storage folder A corresponding to the printer driver A itself or from another printing setting data storage folder B corresponding to another printer driver B. Furthermore, the content of the read out PrintTicket may be partly or entirely applied to the printing-use PrintTicket (described in detail below). In a case where the content of the printing-use PrintTicket is changed as a result of applying the read out PrintTicket, the content of the choices displayed by the selecting parts 311-315 of the printing setting screen 310 is changed in correspondence with the change in the content of the printing-use PrintTicket.

After the desired printing setting is applied, the user returns to the printing setting screen 310 by pressing the close button 336. Then, a printing operation according to the applied printing setting is initiated when the user presses the OK button 316 in the printing setting screen 310. In a case where the user decides to make a further change in the content of the printing settings, the user may make the change by operating on the printing setting screen 310.

Figure 8:
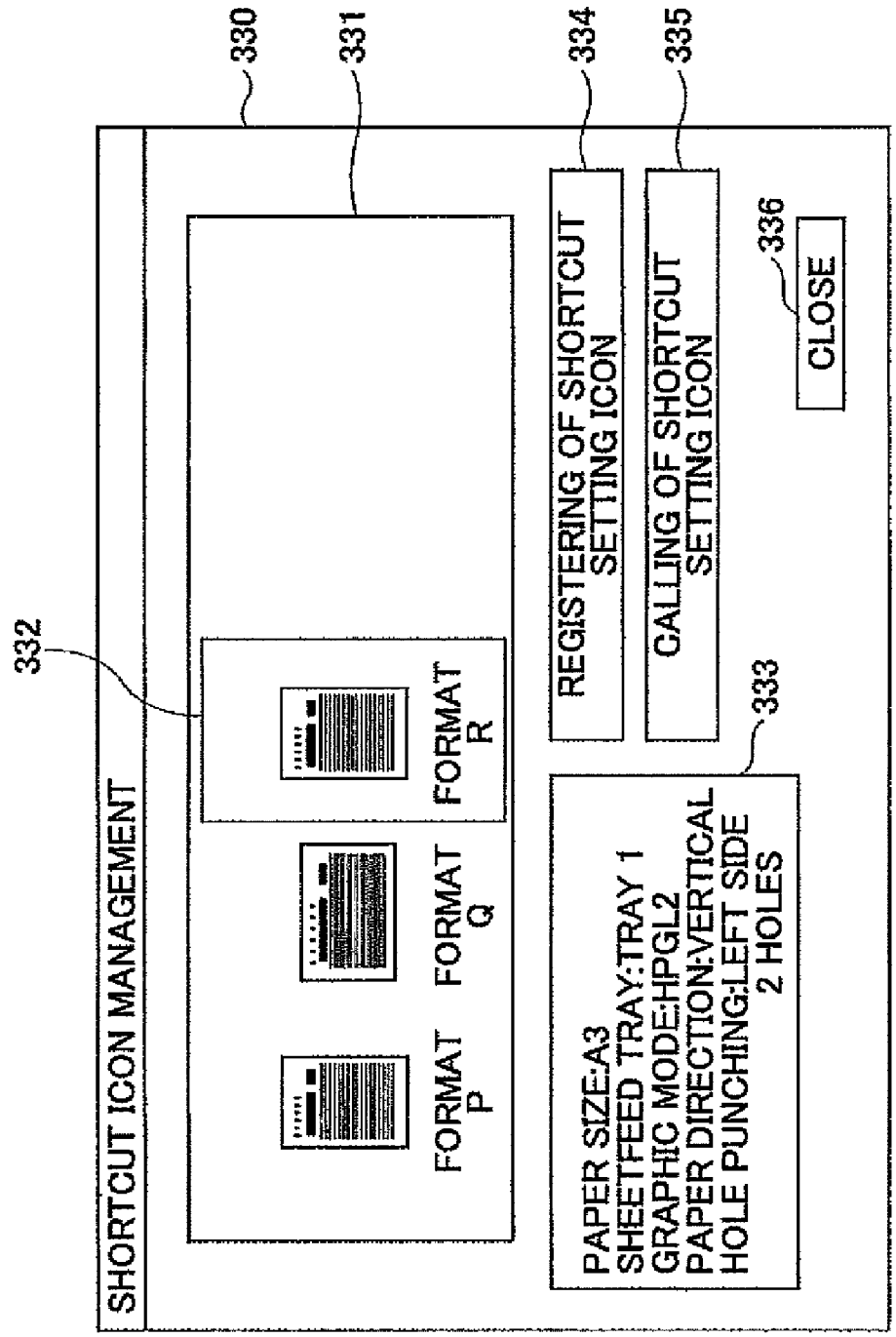
FIG. 8 is a schematic diagram showing an example of a shortcut icon managing screen used for the printer driver A shown in FIG. 4.

Furthermore, the user can register the content of the printing settings of a desired icon displayed in the icon displaying part 310 by selecting (in this example, single-clicking) the desired icon and pressing a registering button 334 (indicated as "registering of shortcut setting icon" in FIG. 8). In this case, the printer driver 110 registers the content of the printing-use PrintTicket at the time of pressing the registering button 334 in a corresponding PrintTicket in the printing setting data storage folder by overwriting the content in the corresponding PrintTicket. The icon is also changed according to the content of the newly registered PrintTicket. Alternatively, instead of an icon already displayed on the icon displaying part 310, a new icon may be fabricated so that the content of the printing setting can be registered as a PrintTicket corresponding to the new icon.

A calling button 334 (indicated as "calling of shortcut setting icon" in FIG. 8) is for receiving an instruction to add an icon corresponding to a printing setting (PrintTicket) registered in another printer driver (e.g., printer driver B in FIG. 4) as a selectable choice in the icon displaying part 331. After the icon is added, the user can instruct a printing setting (PrintTicket) corresponding to the added icon to be read out from a printing setting data storage folder (e.g., printing setting data storage folder B in FIG. 4) corresponding to another printer driver (e.g., printer driver B in FIG. 4).

According to an embodiment of the present invention, even if the registering button 334 is pressed in a state where the added icon is selected (indicated by the cursor 332), a PrintTicket corresponding to the added icon is not registered (overwritten). This is to prevent the content of the printing setting data storage folder corresponding to the other printer driver from being inadvertently changed.

As described above with FIGS. 7 and 8, the user can register a desired printing setting in the form of a PrintTicket beforehand by using the printer driver 110. Accordingly, the user can obtain the registered printing setting by clicking a corresponding icon displayed in the icon displaying part 331. Furthermore, the user can also obtain a printing setting registered by other printer drivers by clicking a corresponding icon displayed in the icon displaying part 331.

The flow of an operation performed by the printer driver 110 when registering a PrintTicket in a printing setting data storage folder is described with reference to FIG. 9.

Figure 9:
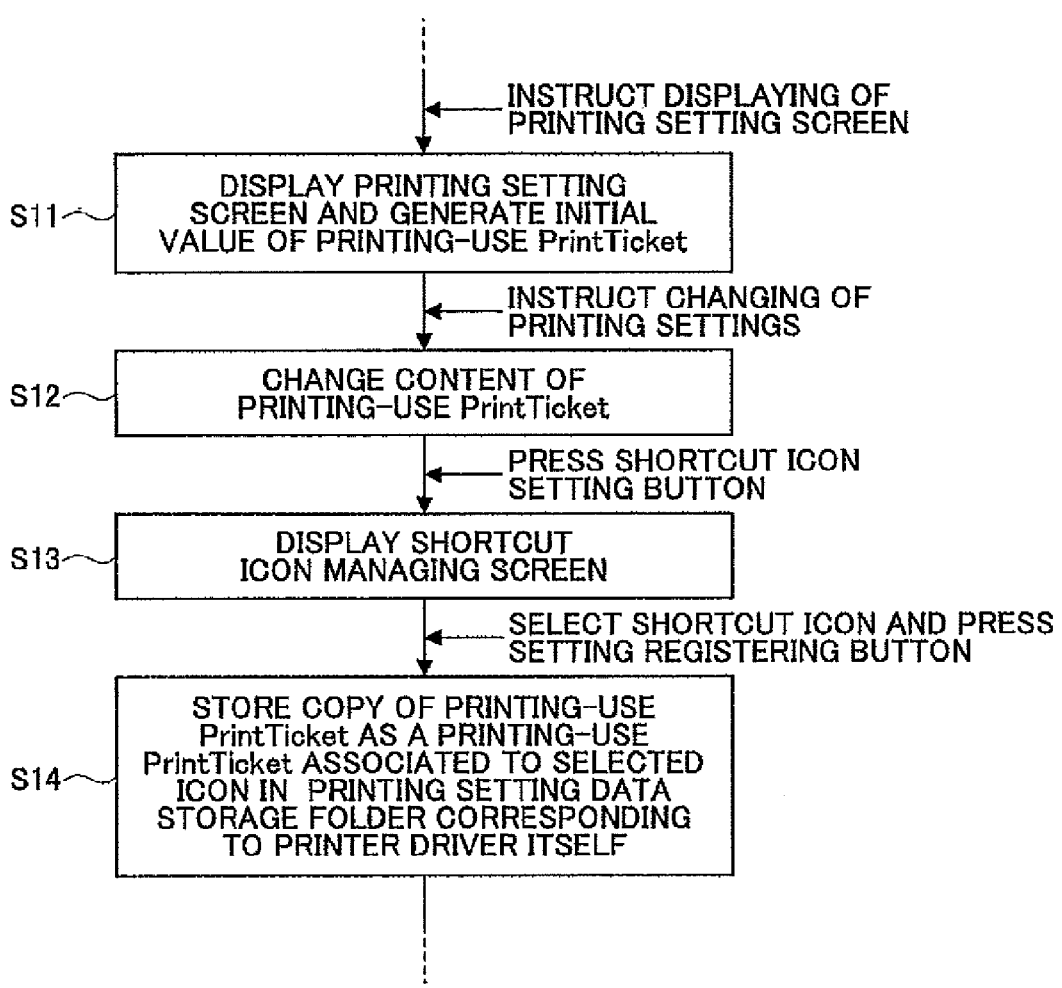
FIG. 9 is a flowchart showing an operation performed by a printer driver shown in FIG. 3 when registering a PrintTicket in a printing setting data storage folder according to an embodiment of the present invention.

Although each step of the operation shown in FIG. 9 is event-driven in response to controls of the user, the operation is explained as a consecutive flow of processes for easier understanding. Although the operation shown in FIG. 9 is actually performed by having the CPU 11 of the PC 10 execute a predetermined program (in this example, printer driver 116), the program (printer driver 110) is described as performing the operation for the sake of convenience.

In FIG. 9, the printer driver 110, upon receiving an instruction to display the printing setting screen 310, displays the printing setting screen 310 (as shown in FIG. 7) on the display device 14 and generates an initial value of the print-use PrintTicket in accordance with an instruction to set the printing settings from the user (Step S11). The instruction to display the printing setting screen 310 includes an instruction to activate the printer driver 110. The activation of the printer driver 110 may be ordered by the user via an application that orders printing or may be ordered directly by the user.

Then, the printer driver 110 changes the content of the printing-use PrintTicket in accordance with an instruction to change the printing settings (printing setting change instruction) of the selection parts 311-315 by the user (S12). In addition, the printer driver 110 also updates the printing setting screen 310.

Then, when the user presses a shortcut setting button 318 after the contents of the printing-use PrintTicket are changed according to the printing setting change instruction, the printer driver 110 displays a shortcut icon managing screen (as shown in FIG. 8) on the display device 14 (Step S13).

Then, when the user selects a desired icon in the shortcut icon managing screen 330 and presses the setting registering button 334, the printer driver 110 stores a copy of the printing-use PrintTicket as a PrintTicket associated with the selected icon in the printing setting data storage folder corresponding to the printer driver 110 itself (Step S14). The copy of the printing-use PrintTicket is the one obtained at the time when the setting registering button is pressed.

By allowing the printer driver 110 to execute the steps S11 through S14, the user can register a PrintTicket indicating contents of a desired printing setting in the printing setting data storage folder.

Next, an exemplary flow of an operation using the PrintTicket registered in the operation shown in FIG. 9 is described with reference to FIG. 10.

Figure 10:
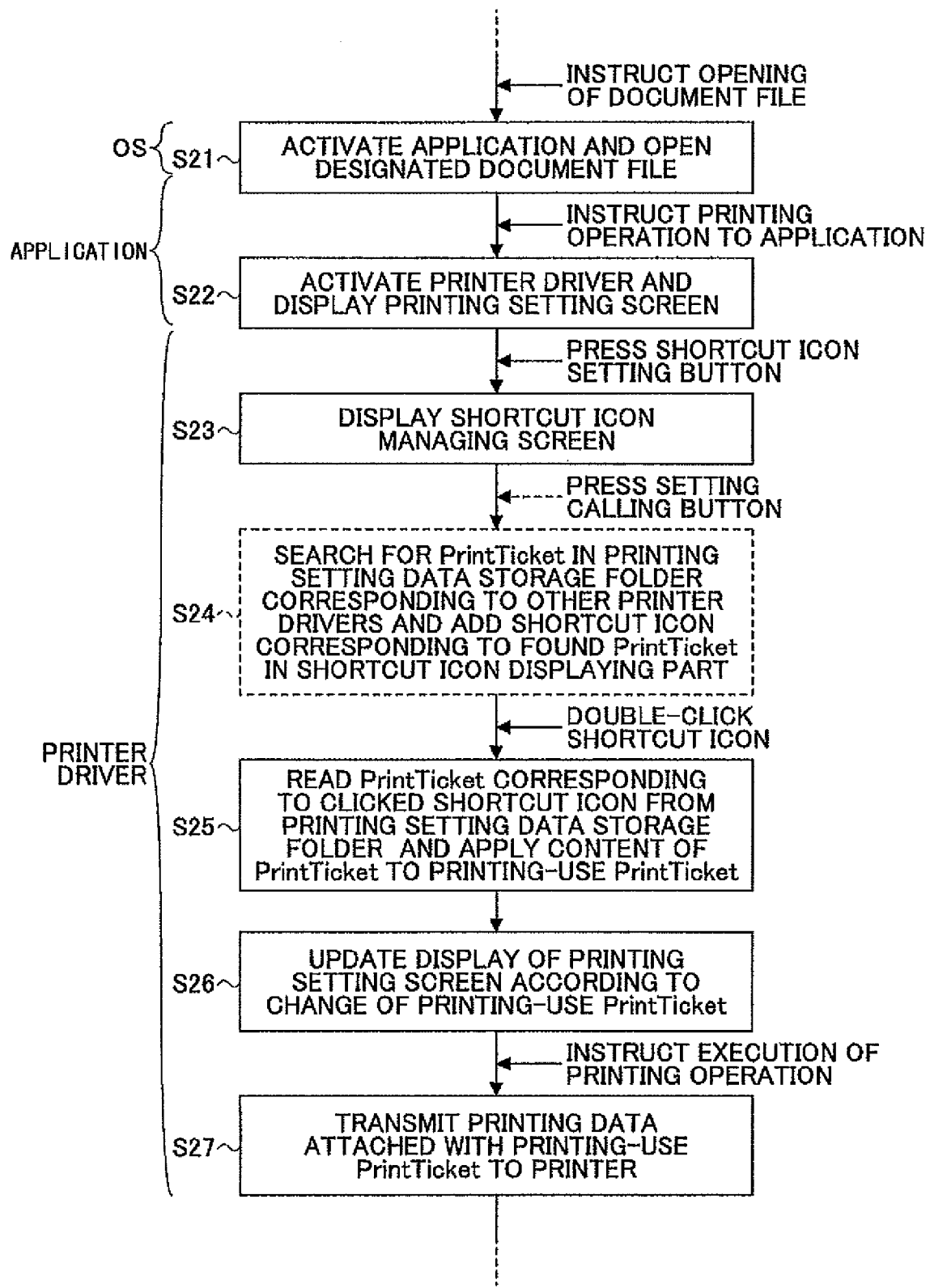
FIG. 10 is a flowchart showing an operation of using the PrintTicket registered in the operation shown in FIG. 9 according to an embodiment of the present invention.

Although each step of the operation shown in FIG. 10 is event-driven in response to controls of the user, the operation is explained as a consecutive flow of processes for easier understanding.

First, when an instruction to open a document file is received from the user, the OS of the PC 10 activates a corresponding application 120 and opens the designated document file (Step S21).

Then, the application 120, upon receiving an instruction to print a document from the user, activates the printer driver 110 for enabling the printer driver 110 to control the printer 20 used in printing the document. When the printer driver 110 is activated, the printing setting screen 310 (shown in FIG. 7) is displayed on the display device 14 by the function of the printer driver 110 (Step S22). In addition, a print-use PrintTicket having a default format is generated.

Then, when the shortcut setting button 318 of the printing setting screen 310 is pressed by the user, the printer driver 110 displays the shortcut icon managing screen 330 (shown in FIG. 8) on the display device 14 (Step S23). In addition, the printer driver 110 also displays an icon, which indicates a PrintTicket stored in the printing setting data storage folder corresponding to the printer driver 110 itself, in the icon displaying part 331.

Then, when the setting calling button 335 of the shortcut icon managing screen 330 is pressed by the user, the printer driver 110 searches for a PrintTicket(s) stored in a printing setting data storage folder corresponding to other printer drivers and displays an icon corresponding to the PrintTicket found by the search in the icon displaying part 331 (Step S24).

The search for the PrintTicket may be performed with respect to all or a predetermined range of folders provided in the PC 10. In the search, files of the PrintTicket may be found by using, for example, extensions and further referring to the content of the feature (feature element) of the "DeviceName" of the obtained files. Thereby, the PrintTicket(s) generated by the printer driver(s) installed in the PC 10 can be obtained.

By conducting the processes in Step S24, the user can select a PrintTicket registered by other printer drivers and apply the settings of the selected PrintTicket to the print-use PrintTicket.

In a case where the user desires to apply the settings of the PrintTicket stored in the printing setting data storage folder corresponding to the printer driver 110 itself to the printing-use PrintTicket, the processes in Step S24 do not need to be conducted.

Then, when the user double-clicks the icon displayed on the shortcut icon managing screen 330 and instructs the printer driver 110 to apply the settings of the double-clicked icon to the printing-use PrintTicket, the printer driver 110 reads the PrintTicket corresponding to the double-clicked icon from a corresponding printing setting data storage folder and applies the content of the read out PrintTicket to the printing-use PrintTicket (Step S25). The process of applying the content of the read out PrintTicket is described in detail below.

In a case where the content of the printing-use PrintTicket is changed as a result of applying the settings of the double-clicked icon, the selection parts 311-315 of the printing setting screen 310 shown in FIG. 7 are changed and the printing setting screen 310 is updated (Step S26).

Then, the user returns to the printing setting screen 310 after closing the shortcut icon managing screen 330 by pressing the close button 336. Then, when the user presses the OK button 316 of the printing setting screen 310, the printer driver 110 generates a printing command including the printing-use PrintTicket attached to the printing data of the document designated for printing and transmits the printing command to the printer (control target) 20. Accordingly, the printer 20 conducts a printing operation according to the content of the settings described in the printing-use PrintTicket (Step S27).

Then, after the processes by the printer driver 110 are finished, the application 120 is subjected to controls by the user. By conducting the steps S21-S27, the user is able to print the document according to the content of the PrintTicket registered in the printing setting data storage folder. Although it is possible to change the content of the printing settings in the printing setting screen 310 between step S26 and step S27, the read out PrintTicket is applied to the printing-use PrintTicket so that a printing operation can be executed immediately according to the settings of the printing-use PrintTicket. In a case where a PrintTicket having desired printing settings is designated to be applied to the printing-use PrintTicket, the CPU 11 of the PC 10 functions as an accepting part for accepting the designation.

After the process of Step S27, the printing-use PrintTicket having the content of the read out PrintTicket applied is stored in the printing setting data storage folder of the printer driver 110 itself. The user can store the printing-use PrintTicket in the printing setting data storage folder by selecting the corresponding icon and pressing the setting registering button 334 in the same manner as Step S14.

Next, reading and applying the PrintTicket as performed in Step S25 of FIG. 10 are described in further detail with reference to FIG. 11.

Figure 11:
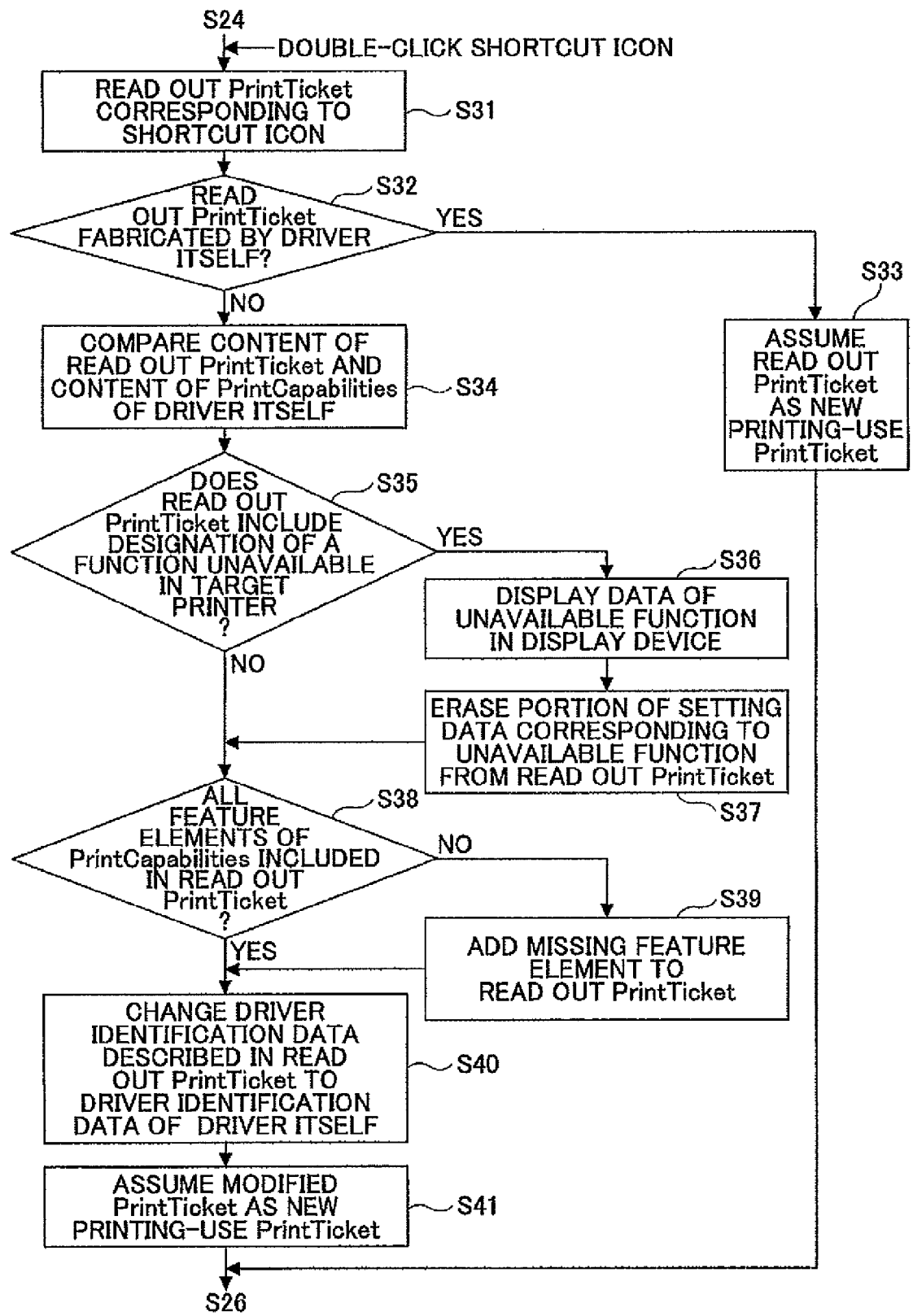
FIG. 11 is a flowchart showing reading and applying the PrintTicket as performed in Step S25 of FIG. 10 are described according to an embodiment of the present invention.

As shown in FIG. 11 when the user double-clicks an icon and instructs the printer driver 110 to apply the printing settings corresponding to the icon, the printer driver 110 reads the PrintTicket corresponding to the icon from a corresponding printing setting data storage folder (Step S31). The address for storing a PrintTicket corresponding to an icon may be stored when displaying the icon on the icon displaying part 331. The CPU 11 of the PC 10 functions as a reading part for performing the process of Step S31.

Then, the printer driver determines whether the read out PrintTicket has been fabricated by the printer driver 110 or by another printer driver (Step S32). The determination is conducted based on identification data of a printer driver included in the read out PrintTicket. In this example, the identification data of the printer driver is "DriverName" described in Feature element (e.g., reference numeral 231 shown in FIG. 6) of the PrintTicket. Alternatively, identification data may be prepared in correspondence with an icon, so that the determination can be conducted based on the identification data. The CPU 11 of the PC 10 functions as a determining part for performing the process of Step S32.

In a case where the determination is "YES" in Step S32, all of the settings described in the read out PrintTicket are regarded to be applicable to the printer (control target) 20. Therefore, the read out PrintTicket is assumed as a new printing-use PrintTicket without changing the settings of the read out PrintTicket. Accordingly, the content of the settings (setting data) described in the read out PrintTicket is applied as a setting content of the printing-use PrintTicket (Step S33). In this case, there is no need to change the "DriverName" of the Feature element. In the case where the determination is "YES" in Step S32, the CPU 11 of the PC 10 functions as a first controlling part. It is to be noted that in a case where there is a header or a footer added to the PrintTicket, the content of the header or the footer is changed in Step S33.

In a case where the determination is "NO" in Step S32, the read out PrintTicket is regarded as a PrintTicket fabricated to be used by another printer driver. Thus, there is a possibility that the read out PrintTicket includes settings that cannot be used by the printer (control target) 20. Therefore, the content of the read out PrintTicket and the content of the PrintCapabilities of the printer driver 110 itself are compared (Step S34). The "PrintCapabilities" used in this example indicate functions of the printer 20.

The comparing process of Step S34 is described below in further detail with reference to a flowchart shown in FIG. 12.

In the comparing process of Step S34, first, a single feature element is obtained (Step S51). Then, it is determined whether there is a feature element in the PrintCapabilities in which both the name of the feature element and the name of the option element of the feature element are the same as those of the feature element obtained in Step S51 (Step S52). The option element is a subordinate element of the feature element. Even in a case where the read out PrintTicket has a feature element (function) that is also provided in the printer (control target) 20, the printer 20 may not be able to provide an option item (selection item) designated by the read out PrintTicket. For example, in a case where the selection item is "paper size", the printer 20 may only be able to supply "A4 size" paper even though "A3 size" paper is selected in the read out PrintTicket. Therefore, not only is the feature element determined but also the option element is determined in Step S52.

In a case where the determination is "YES" in step S52, the target printer 20 is regarded as having a function(s) to perform a printing operation according to the settings of the feature element obtained in Step S51 (function available). In a case where the determination is "NO" in Step S52, the target printer 20 is regarded as not having a function(s) to perform a printing operation according to the settings of the feature element obtained in step S51 (function unavailable).

Furthermore, in the case where the determination is "NO" in Step S52, the data indicating that the function of the feature obtained in Step S51 is unavailable in the target printer 20 is stored (registered) in, for example, the ROM 12 or the HDD 16 (Step S53).

Regardless of whether the determination is YES or NO in Step S52, it is next determined whether there are any feature elements remaining in the read out PrintTicket (Step S54). If there is a feature element remaining in the read out PrintTicket, the comparing process returns to Step S51. When all feature elements in the read out PrintTicket are obtained and determined, the comparing process proceeds to Step S35 shown in FIG. 11. It is to be noted that feature elements having no relationship with functions of the target printer 20 do not need to be subject to the determination. For example, a feature element such as "DriverName" does not need to be determined because such a feature element might not be included in the PrintCapabilities in the first place. Furthermore, storing of data in Step S53 may be omitted.

Figure 12:
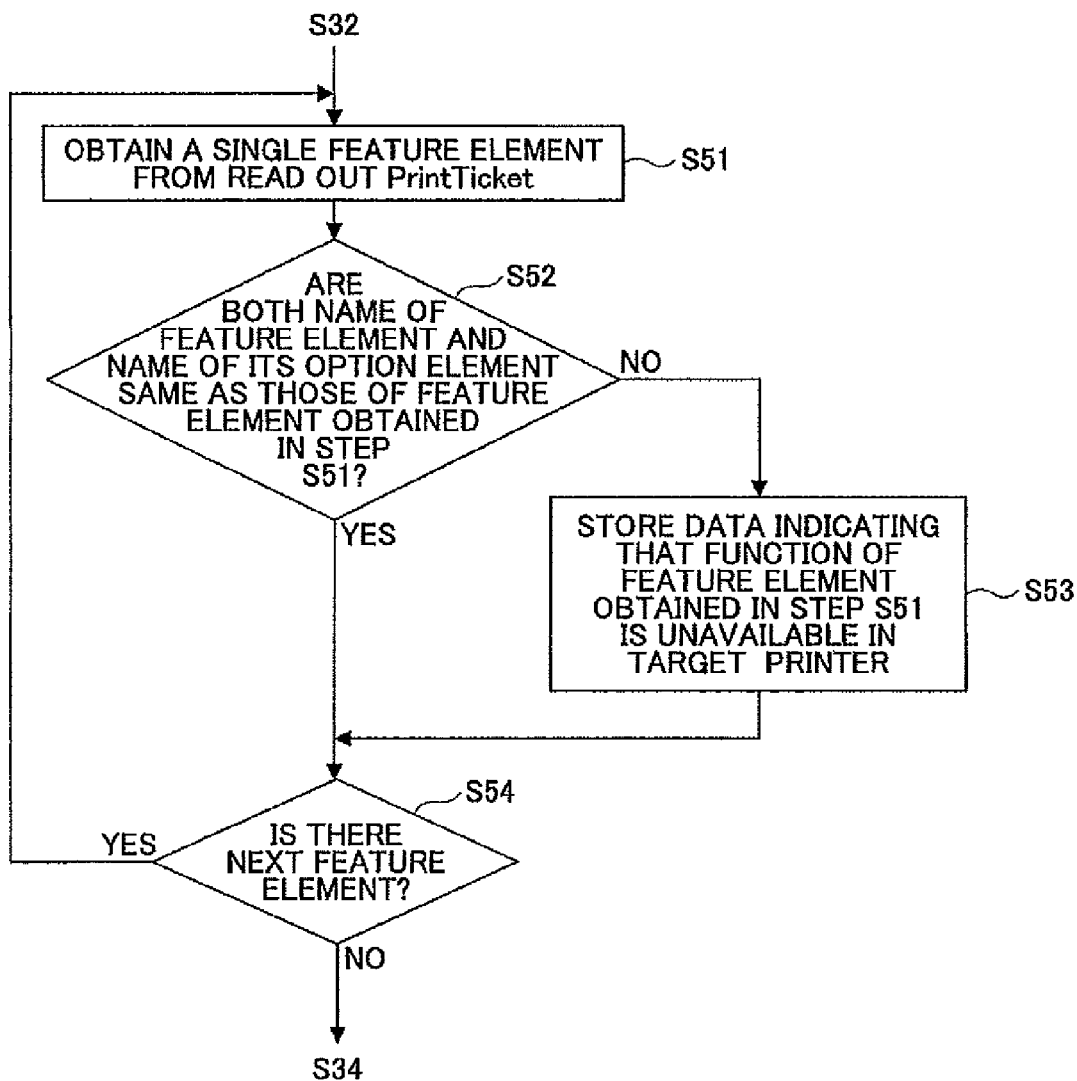
FIG. 12 is a flowchart showing the comparing process of Step S34 of FIG. 11 according to an embodiment of the present invention.

Accordingly, by performing Steps S51-S54 shown in FIG. 12, it can be determined whether the setting of the PrintTicket read out in Step S31 of FIG. 11 is a setting within the capability of the target printer 20 or beyond the capability of the target printer 20.

Returning to FIG. 11, the printer driver 110 determines whether the PrintTicket read out in Step S31 includes a designation of a function unavailable in the target printer 20 (Step S35). In other words, it is determined whether any data are stored in Step S53 of FIG. 12.

In a case where the determination is "YES" in Step S35, the data of the unavailable function, that is, the data stored in Step S53 of FIG. 12, are displayed on the display device 14 (Step S36). For example, in addition to displaying the unavailable function (choice) of the target printer 20 on the display device 14, a message indicating that setting of the unavailable function (choice) cannot be achieved is also displayed (see FIG. 13). In this example, the displaying of the unavailable function (choice) is performed by using a character string included in GPD (Generic Printer Description) data (not shown). The corresponding relationship between the attribute "name" of the feature element, the option element and the character string in the GPD data are managed in the printer driver 110.

Then, the PrintTicket read out in Step S31 is subject to modification, for example, by erasing a portion of setting data corresponding to the unavailable function from the readout PrintTicket (Step S37). For example, a portion of the feature element stored in Step S53 of FIG. 12 is erased.

On the other hand, in a case where the determination is "NO" in Step S35, all the functions required for achieving the content of the settings described in the read out PrintTicket are available in the target printer 20. At this stage, the PrintTicket read out in Step S31 is not subject to modification.

Regardless of whether the determination is YES or NO in Step S35, it is determined whether all of the feature elements included in PrintCapabilities are included in the PrintTicket read out in Step S31 (Step S38). That is, it is determined whether all of the settings required for the target printer 20 can be performed based on the descriptions in the PrintTicket.

In a case where the determination is "NO" in Step S38, the unavailable feature element is added to the read out PrintTicket modified in Step S37 (Step S39). In this case, the option element subordinate to the added feature element follows the descriptions in a default PrintTicket (Step S39). Even if all of the feature elements described in the PrintCapabilities are included in the PrintTicket read out in Step S31, there may be a mismatch of option elements. In this case, the feature element corresponding to the mismatching option element is erased in Step S37. Accordingly, the feature element corresponding to the erased feature element is added in Step S39. On the other hand, in a case where the determination is "YES" in Step S38, no modification is performed on the PrintTicket read out in Step S40).

Then, regardless of whether the determination is YES or NO in Step S38, the content of the driver identification data (e.g. feature name "DriverName") described in the read out PrintTicket (PrintTicket after being subject to the processes of Step S37 and/or Step S39) is changed to that of the driver identification data of the printer driver 110 itself (Step S40). In a case where there is a header or a footer in the read out PrintTicket, the header or the footer is also changed to the appropriate header or footer of the printer driver 110 itself in Step S40. The read out PrintTicket modified in the above-described manner is assumed as a new printing-use PrintTicket (Step S41).

By performing the steps S35 through S41, the content of the settings of the PrintTicket read out in Step S31 is applied within the capability of the target printer 20 based on the results of comparing the feature elements of the read out PrintTicket and the PrintCapabilities of the printer driver 110 itself. The CPU 11 of the PC 10 functions as a second controlling part for performing the processes in steps S35 through S41.

By performing the step S33 or the steps 34 through S41, the printer driver 110 can apply appropriate settings of a PrintTicket corresponding to the double-clicked icon depending on whether the PrintTicket is fabricated by the printer driver 110 itself or by another printer driver.

Next, an exemplary case is described where the content of a PrintTicket stored in a printing setting data storage folder corresponding to another printer driver A (see FIG. 4) is applied to a printing use PrintTicket used by a printer driver B (see FIG. 4) for performing a printing operation.

FIG. 14 shows PrintCapabilities 1400 included in the printer driver B.

The PrintCapabilities 1400 indicate the functions of a printer 20*b* which is controlled by the printer driver B. The format of the PrintCapabilities is substantially the same as the PrintCapabilities 500 shown in FIG. 5. The difference of functions between the printer 20*b* and the printer 20*a* is that the printer 20*b* lacks a hole-punching function. Thus, the only difference between the content of the PrintCapabilities 1400 and the content of the PrintCapabilities 500 is that there is no feature element indicating the hole-punching function "JobHolePunch" in the PrintCapabilities 1400.

FIG. 15 shows an example of a printing setting screen 310' used by the printer driver B.

Because the control target (printer B) of the printer driver B has no hole-punching function, there is no selecting part corresponding to a hole-punching function in the printing setting screen 310' as the hole-punching selecting part 315 displayed in the printing setting screen 310 used by the printer driver A. Other than this difference, the printing setting screen 310' used by the printer driver B is the same as the printing setting screen 310 used by the printer driver A.

FIG. 16 shows a default PrintTicket 1600 indicating data of initial values of the printing settings of the printer driver B.

The data corresponding to feature elements 402 through 405 indicate that the initial value for a paper size selecting part 311 is "A4", the initial value for a sheetfeed tray selecting part 312 is "automatic tray selection", the initial value for a graphic mode selecting part 313 is "raster", and the initial value for a document direction selecting part 314 is "vertical". The feature element 401 is for indicating that the PrintTicket 1600 is fabricated by the printer driver B. Accordingly, the content of the default PrintTicket 1600 becomes the initial value of the printing-use PrintTicket fabricated by the printer driver B.

In a case where a shortcut icon setting button 318 of the printing setting screen 310' is pressed by the user, the printer driver B displays a shortcut icon managing screen 330'.

Figure 17:
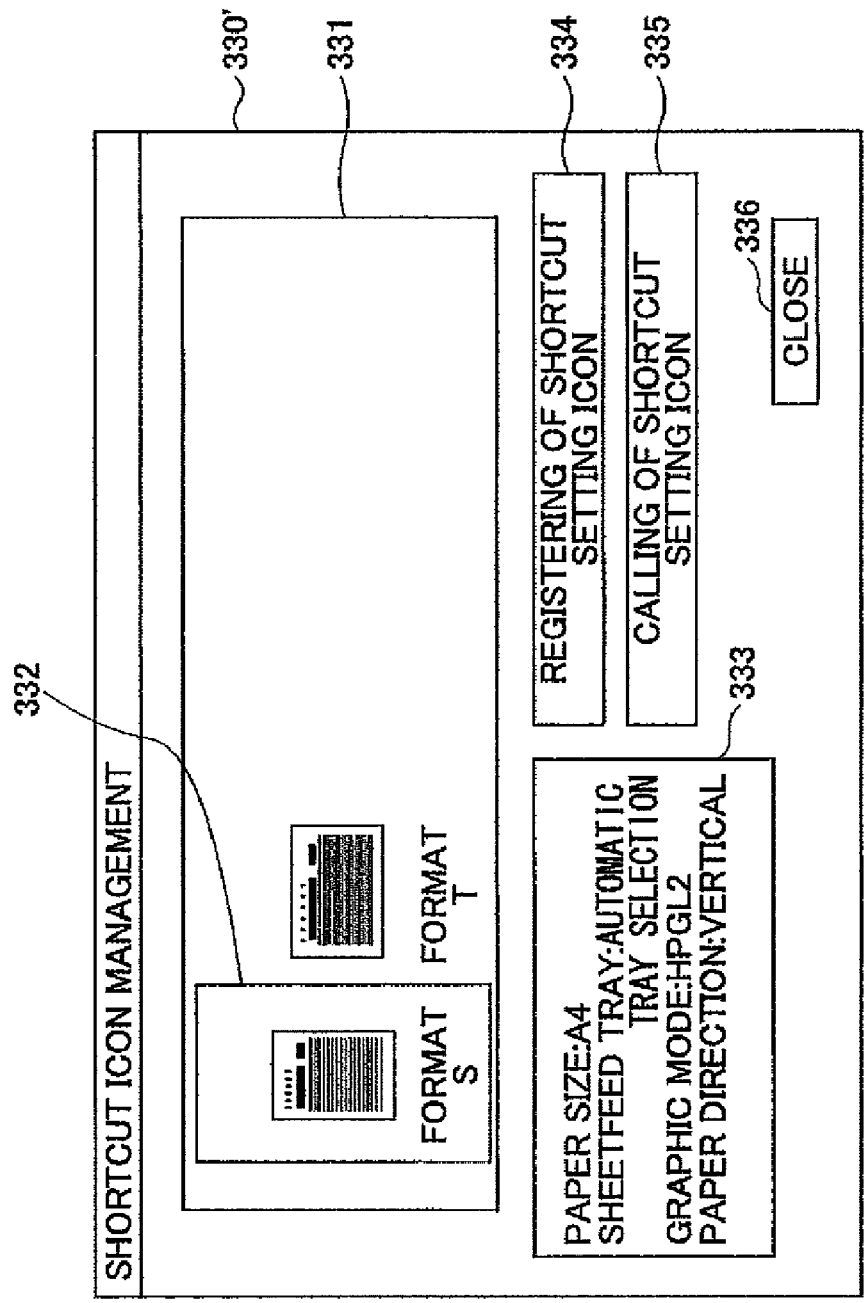
FIG. 17 is a schematic diagram showing an example of a shortcut icon managing screen used for the printer driver B shown in FIG. 4 according to an embodiment of the present invention.
Figure 18:
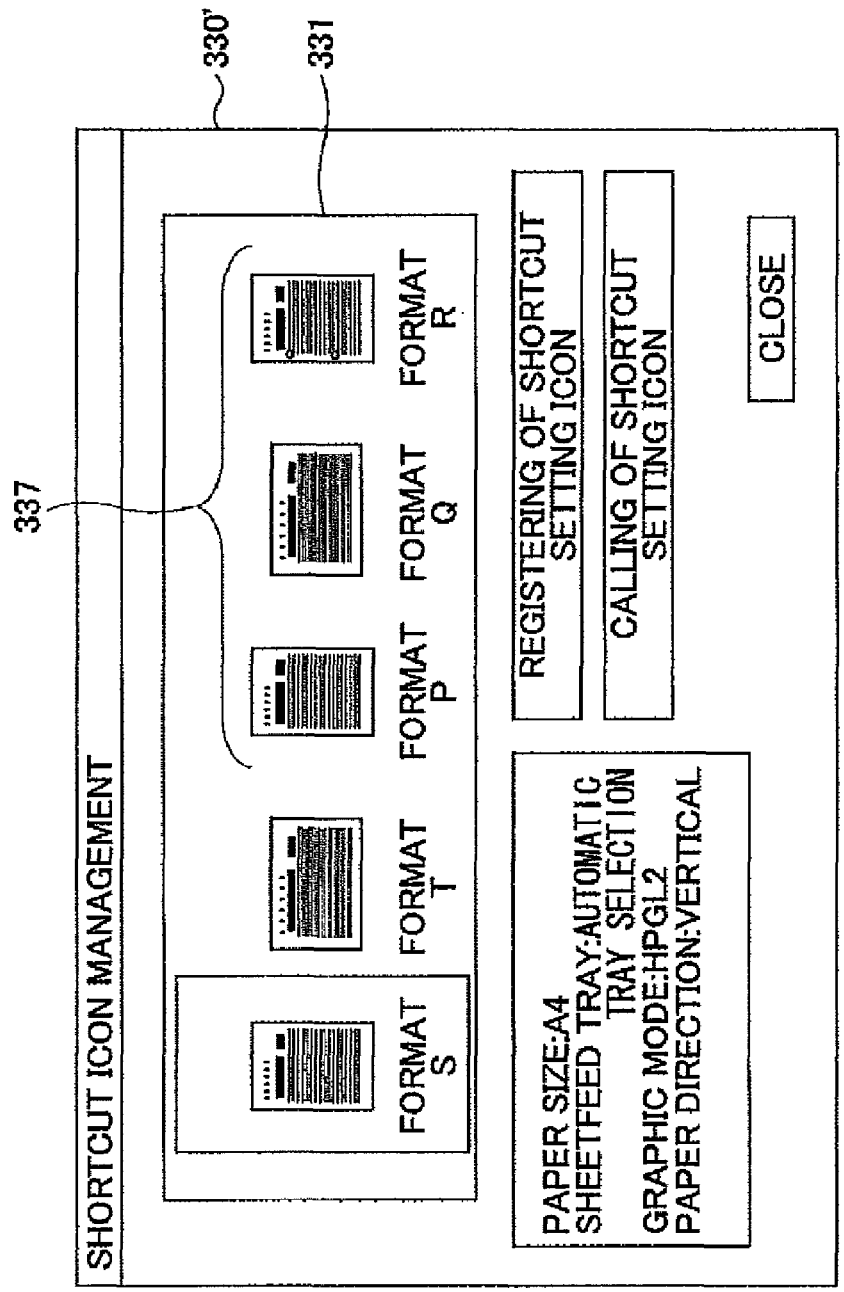
FIG. 18 is a schematic diagram showing another example of a shortcut icon managing screen used for the printer driver B shown in FIG. 4 according to an embodiment of the present invention.

FIGS. 17 and 18 are examples of the shortcut icon managing screen 330' used by the printer driver B.

The frame and arrangement of buttons of the shortcut icon managing screen 330' is substantially the same as those of the shortcut icon managing screen 330 (see FIG. 8) used by the printer driver A. However, as shown in FIG. 4, only printing setting data files (PrintTickets) S and T are registered in the printing setting data storage folder B corresponding to the printer driver B. Therefore, at the time of initially displaying the shortcut icon managing screen 330', icons of formats S and T corresponding to PrintTickets S and T are displayed in the icon displaying part 331 as shown in FIG. 17.

When the user presses the icon corresponding to "calling of shortcut setting icon", the printer driver B searches for Print-Tickets stored in the printing setting data storage folders corresponding to other folders. In a case where PrintTickets P-R stored in the printing setting data storage folder A are found, the printer driver B adds the icons of formats P-R corresponding to the found PrintTickets P-R in the icon displaying part 331 as shown with reference numeral 337 in FIG. 18.

Then, when the user double-clicks the icon of format P, the printer driver B executes the processes of Steps S31 through S41 of FIG. 11, so that the content of the PrintTicket P corresponding to the double-clicked icon is read out from the printing setting data storage folder A and applied to the setting content of a printing-use PrintTicket.

In comparing the content of the PrintTicket P (same as PrintTicket 600 in FIG. 6) and the content of the PrintCapabilities 1400 of the printer driver B in Step S34 of FIG. 11, the printer driver B recognizes that the function "JobHolePunch" in the content of the PrintTicket P is unavailable in the target printer (control target) 20b.

Therefore, in the case of applying the content of the read out PrintTicket P, the printer driver B modifies the content of the read out PrintTicket P by erasing the feature element corresponding to the unavailable "JobHolePunch" from the content of the read out PrintTicket P. Accordingly, the modified PrintTicket P includes all feature elements included in the PrintCapabilities of the printer driver B. The read out Print-Ticket is further modified by changing the content of the feature element "DriverName" to the identification data of printer driver B.

FIG. 19 shows a printing-use PrintTicket 1900 fabricated by the printer driver B as a result of the above-described modification.

The printing-use PrintTicket 1900 of FIG. 19 shows that the content of the four feature elements "PageMediaSize", "JobInputBin", "JobGraphicsMode", and "PageOrientation" are the same as those of PrintTicket 600 of FIG. 6 except for the feature element "DriverName".

As another example, in a case of applying the content of a PrintTicket 2000 shown in FIG. 20 to the content of a printing-use PrintTicket, the printer driver B recognizes that all the functions in the content of the PrintTicket 2000 are available in the target printer 20b as a result of comparing the content of the PrintTicket 2000 and the content of the PrintCapabilities 1400 of the printer driver B in Step S34 of FIG. 11. As shown in FIG. 20, the PrintTicket 2000 includes all of the feature elements included in the PrintCapabilities 1400 of the printer driver B.

Then, the printer driver B modifies the PrintTicket 2000 by changing the feature element "DriverName" to the identification data of the printer driver B. As a result, a printing-use PrintTicket 2100 as shown in FIG. 21 is obtained.

The feature elements of the PrintTicket 2100 are the same as those of the PrintTicket 2000 except for the feature element "DriverName".

On the other hand, in a case where the printer driver A applies the content of a PrintTicket 2000 shown in FIG. 20 to the content of a printing-use PrintTicket, the printer driver A recognizes that all the functions in the content of the Print-Ticket 2000 are available in a target printer 20a as a result of comparing the content of the PrintTicket 2000 and the content of the PrintCapabilities 500 of the printer driver A in Step S34 of FIG. 11. However, the feature element "JobHolePunch" in the feature elements of the PrintCapabilities of the printer driver A is not included in the PrintTicket 2000.

Therefore, the printer driver A modifies the PrintTicket 2000 by adding the content of the feature element "Job-HolePunch" included in a default PrintTicket (not shown) to the PrintTicket 2000. Furthermore, the printer driver A also modifies the PrintTicket 2000 by changing the content of the feature element "DriverName" to the identification data of the printer driver A.

As a result, a printing-use PrintTicket 2200 as shown in FIG. 22 is obtained.

The feature elements of the printing-use PrintTicket 2200 are the same as those of PrintTicket 2000 except for the "DriverName" and the "JobHolePunch" that was not included in the initial PrintTicket 2000 shown in FIG. 20.

Accordingly, by using a printing-use PrintTicket fabricated according to a PrintTicket fabricated by another printer driver as shown in FIGS. 19-22, a target printer can perform a printing operation according to the settings of one or more PrintTickets of other printer drivers.

Hence, with the above-described printer driver 110 according to an embodiment of the present invention, the user can obtain and use the printing settings fabricated and stored by other printer drivers. Thereby, the printer driver 110 is much more usable than it would have otherwise been.

As described above, the printer driver 110 compares the content of a PrintTicket fabricated by another printer driver with the content of its PrintCapabilities and applies the content of the PrintTicket to a printing-use PrintTicket within the functions of its target printer 20. Therefore, even if the Print-Ticket fabricated by another printer driver includes a function that is unavailable in its target printer 20, suitable setting data of the PrintTicket can be applied to the setting content of the printing-use PrintTicket of the printer driver 110.

Particularly, in a case where the read out PrintTicket includes a setting that is not included in the functions of the printer, the setting is erased and not applied to the printing-use PrintTicket. Therefore, failure can be prevented in the operation of the printer driver 110 or the target printer 20 due to inappropriate data applied to the printing-use PrintTicket.

In accepting selection of a PrintTicket desired by the user, only the PrintTicket(s) stored in a corresponding printing setting data storage folder of the printer driver 110 itself are initially provided as choices for the selection. PrintTickets stored in printing setting data storage folders of other printer drivers are added to the choices when directed by the user. This prevents any confusion of the user caused by providing too many unnecessary choices of printing settings of other PrintTickets.

Furthermore, because selection of the PrintTicket to be read out is performed by using graphic symbols (e.g., icon) that show the resultant format obtained by performing a printing operation according to the settings of the selected Print-Ticket, the user can easily understand the content of the choices of PrintTickets and select a desired PrintTicket.

Modified Examples

FIGS. 23-28, 29

As one modified example, the printer driver 110 may register combinations of non-allowable settings (non-allowable control settings) as exclusive setting data so that the print driver can prevent non-allowable settings from being applied to a printing-use PrintTicket in a case where the exclusive setting data are included in a read out PrintTicket.

An example of exclusive setting data 2300 is described with reference to FIG. 23.

In the exclusive setting data 2300 shown in FIG. 23, a combination of non-allowable settings is indicated by a setting item (corresponding to a feature element) and a setting value (corresponding to an option element) inside a bracket after "LIST" in each line.

For example, the first line of the exclusive setting data shows a value "Tray 1" being set in correspondence with an item "InputBin (sheetfeed tray)" and a value "A3" being set in correspondence with an item "PaperSize (paper size)". This indicates that a combination of "Tray 1" and "A3" is not allowed to be set in the corresponding items of "InputBin" and "PaperSize". Likewise, the second and third lines indicate that neither a combination of "Tray 1" and "A6" nor a combination of "Tray 1" and "B4" are allowed to be set in the corresponding items of "InputBin" and "PaperSize".

The exclusive setting data 2300 can be effectively used in a case where a printer can provide various choices (e.g., various paper sizes) but can only provide a limited choice when a predetermined function is selected. For example, this may be applied to a case where A4 size paper can only be fed from a sheetfeed tray even though a printer engine can print images not only on A4 size paper but also on A3 size paper.

In this example, the exclusive setting data 2300 are described as GPD (Generic Printer Description) data. Thus, the exclusive setting data 2300 are described differently from the character strings indicating the items and values of the PrintTicket. Accordingly, a relationship between the data of the PrintTickets and the data of the exclusive setting 2300 is managed independently by the printer driver 110.

An operation of an exclusive control (exclusive control operation) is described with reference to FIG. 24.

This operation may be conducted between Step S40 and S41 of FIG. 11.

After a modified PrintTicket is obtained, it is determined whether an exclusive setting is included in the modified PrintTicket (Step S61).

Then, in a case where an exclusive setting is found in the modified PrintTicket, the content of the found exclusive setting is displayed in the display device 14 (Step S62).

As shown in FIG. 25, the combination of the settings regarded as the exclusive setting is displayed on the display device 14 together with a message indicating that the function corresponding to the exclusive setting cannot be set. In the same manner as the example of FIG. 13, the message indicating the exclusive setting is based on GPD data.

After displaying the message together with the exclusive setting, the item(s) corresponding to the exclusive setting is changed with the content of a default PrintTicket (Step S63). Accordingly, the content corresponding to the exclusive setting is not applied to the printing-use PrintTicket.

Although the contents of the default PrintTicket ordinarily would not be combined as exclusive settings, the operation may return to Step S61 for ensuring that no exclusive setting is included after the process in Step S63.

Then, in a case where the determination in Step S61 is "NO", the operation proceeds to Step S41 of FIG. 11.

The CPU 11 of the PC 10 functions as an exclusive controlling part for performing the processes in Steps S61-S63.

In a case of using a PrintTicket fabricated by the printer driver 110 itself, there is no need to determine whether an exclusive setting is included in the PrintTicket because this determination is already performed when registering the PrintTicket in the printing setting data storage folder corresponding to the printer driver 110 itself.

Next, a more detailed example of applying printing settings with consideration of the exclusive settings is described. This example is explained by using the above-described case where the content of a PrintTicket 2600 (see FIG. 26) stored in the printing setting data storage folder A corresponding to another printer driver A (see FIG. 4) is applied to a PrintTicket used by a printer driver B (see FIG. 4) for performing a printing operation. Furthermore, in this example, a PrintTicket 2700 fabricated by the printer driver B after Step S41 of FIG. 11 is shown in FIG. 27. The PrintTicket 2700 shows that a feature element "JobHolePunch" corresponding to an unavailable feature element of printer 20b is deleted and that the identification data of the printer driver A is replaced with the identification data of the printer driver B.

Then, the printer driver B determines whether exclusive data are included in the PrintTicket 2700 (Step S61). As a result of the determination, the printer driver B recognizes that exclusive settings are included because a combination of "Tray 1" and "A3" are set to corresponding feature elements "JobInputBin" and "PageMediaSize".

Accordingly, the printer driver B changes the items corresponding to the exclusive settings with contents of a default PrintTicket, to thereby fabricate a printing-use PrintTicket shown in FIG. 28.

Accordingly, in a case of applying the content of a PrintTicket fabricated by another printer driver, an exclusive setting can be prevented from being applied to a printing-use PrintTicket. Thereby, a printing operation can be performed according to a suitable printing setting. Because combinations of exclusive settings differ depending on the printer drivers 110, there may be a case where a combination of settings is an exclusive setting for one printer driver but is not an exclusive setting for another printer driver. Therefore, it is preferable to perform the above-described exclusive control operation in a case of applying the entire content of the settings of a PrintTicket read out from a printing setting data storage folder corresponding to another printer driver to the content of the printing-use PrintTicket.

As another modified example, the function of registering a PrintTicket into a printing setting data storage folder or the function of applying a PrintTicket fabricated by another printer driver may be provided in one or more designated printer drivers. Furthermore, a PrintTicket to be used for a printing-use PrintTicket may be retrieved from another apparatus located outside of the PC 10.

Furthermore, the arrangement of the GUI does not need to be the same among the printer drivers 110. The GUI may be different among the printer drivers 110.

Figure 24:
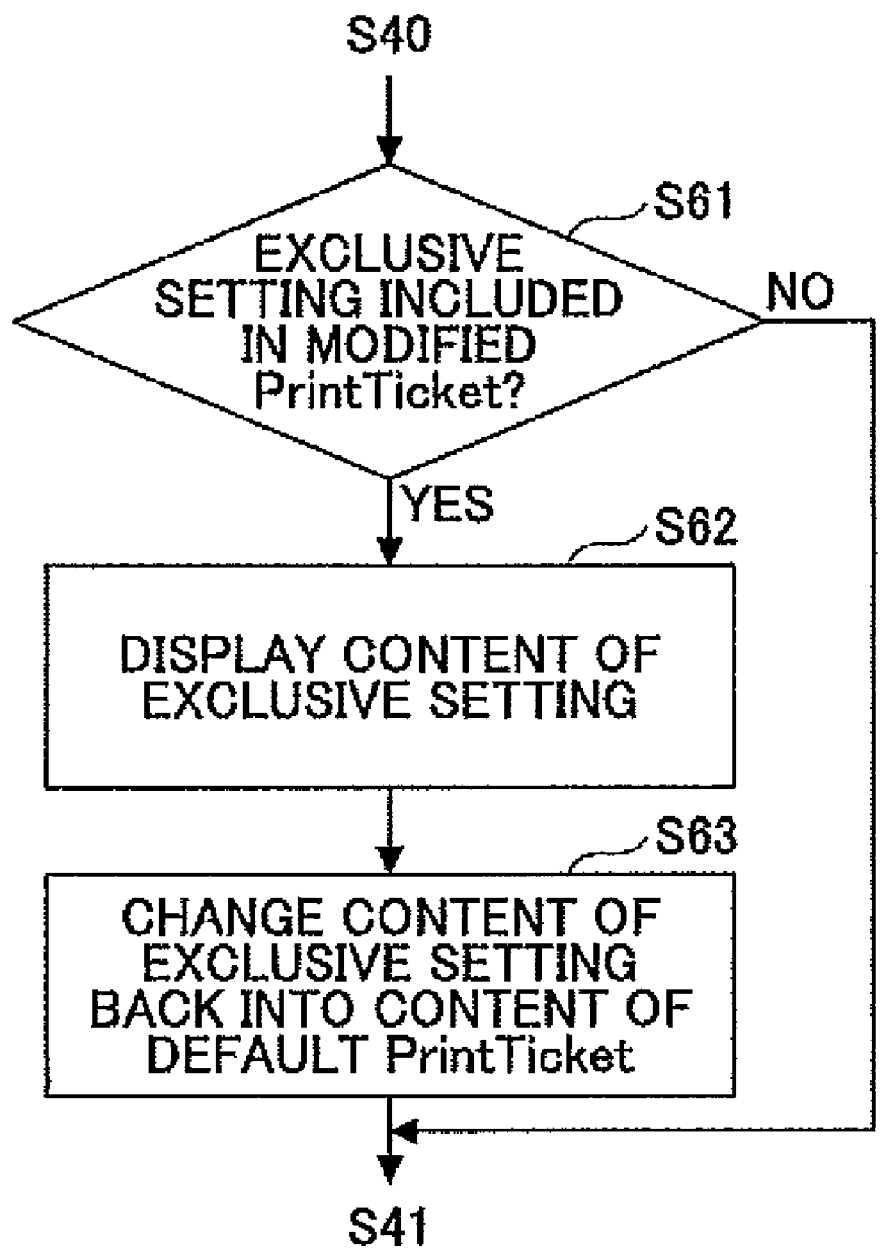
FIG. 24 is a flowchart showing an operation of an exclusive control (exclusive control operation) according to an embodiment of the present invention.

Furthermore, as an alternative of the process in Step S39 of FIG. 11 or Step S63 of FIG. 24, the content of a printing-use PrintTicket existing at the time of reading out a PrintTicket may be used instead of the missing feature element or exclusive setting.

Furthermore, although a new printing-use PrintTicket is fabricated by modifying a PrintTicket read out from a printing setting data storage folder in the above-described embodiment shown in FIG. 11, a new printing-use PrintTicket may be fabricated by having a portion of a printing-use PrintTicket existing at the time of reading out a PrintTicket overwritten with a corresponding portion of a read out PrintTicket.

Although the content of the settings for controlling a device (control target) 20 is handled as data in the form of a PrintTicket and the function of a device (control target) 20 is handled as data in the form of PrintCapabilities according to the above-described embodiment of the present invention, the same functions can be achieved by using data of other formats.

The functions or selectable choices provided by the printers 20 or the device drivers 110 are not limited to those described above.

The present invention is applied not only to the data processing apparatus 10 using the device driver 110 for controlling the printer 20, but may also be applied to a data processing apparatus using a device driver for controlling an image forming apparatus (e.g., scanner, facsimile machine, copier) or an electronic device used for, for example, a network domestic electric appliance, an automatic vending machine, a medical device, an electric power apparatus, a ventilation system, a metering system (gas, water, electricity), an automobile, or an aircraft.

The recording medium 200 according to an embodiment of the present invention is a computer-readable recording medium on which a program is recorded for causing the PC (data processing apparatus) 10 to execute the above-described operation of controlling the printer (device) 20. The recording medium 200 can be obtained in the form of a distributable recording medium (CD, DVD, etc.) but also as a medium downloadable from a network (e.g., the Internet).

The present invention is not limited to the specifically disclosed embodiments, and variations and modifications may be made without departing from the scope of the present invention.

The present application is based on Japanese Priority Application Nos. 2007-212325 and 2008-148305 filed on Aug. 16, 2007 and Jun. 5, 2008, respectively, with the Japanese Patent Office, the entire contents of which are hereby incorporated herein by reference.

What is claimed is:

1. A data processing apparatus including a device driver part for controlling a device, comprising:
    a storing part configured to store device capability data;
    a receiving part configured to receive a designation of a PrintTicket having setting data indicating control settings used for controlling the device;
    a determining part configured to determine whether the designated PrintTicket has been fabricated by the device driver part or another device driver part;
    a first controlling part configured to apply all of the setting data to the control settings in a case where the designated PrintTicket is determined to be fabricated by the device driver part;
    a second controlling part configured to compare the device capability data with the setting data and apply at least a part of the setting data to the control settings in a case where the designated PrintTicket is determined to be fabricated by the other device driver part;
    an exclusive setting data storing part configured to store data of non-allowable control settings; and
    an exclusive controlling part configured to compare all of or part of the setting data to be applied to the control settings by the first or second controlling parts with the non-allowable control settings and refrain from applying all of or part of the setting data to the control settings in a case where all of or part of the setting data are included in the non-allowable control settings.

2. The data processing apparatus as claimed in claim 1, wherein the second controlling part is configured to compare the device capability data with the setting data and refrain from applying a part of the setting data, which is not included in the device capability data, to the control settings.

3. The data processing apparatus as claimed in claim 1, wherein the receiving part is configured to provide one or more choices of PrintTickets stored in the device driver part and add another choice of a PrintTicket stored in the other device driver part to the provided choices according to an instruction from a user.

4. The data processing apparatus as claimed in claim 1, wherein the device is a printer, wherein the receiving part is configured to display one or more graphic symbols corresponding to PrintTickets having setting data that can be applied to the control settings of the printer.

5. A device controlling method for causing a device driver part to control a device, the method comprising the steps of:
    a) storing device capability data;
    b) receiving a designation of a PrintTicket having setting data indicating control settings used for controlling the device;
    c) determining whether the designated PrintTicket has been fabricated by the device driver part or another device driver part;
    d) applying all of the setting data to the control settings in a case where the designated PrintTicket is determined to be fabricated by the device driver part;
    e) comparing the device capability data with the setting data and applying at least a part of the setting data to the control settings in a case where the designated PrintTicket is determined to be fabricated by the other device driver part;
    f) storing data of non-allowable control settings; and
    g) comparing all of or part of the setting data to be applied to the control settings in steps d) or e) with the non-allowable control settings and refraining from applying all of or part of the setting data to the control settings in a case where all of or part of the setting data are included in the non-allowable control settings.

6. The device controlling method as claimed in claim 5, wherein step e) includes the steps of comparing the device capability data with the setting data and refraining from applying a part of the setting data, which is not included in the device capability data, to the control settings.

7. The device controlling method as claimed in claim 5, wherein step b) includes the steps of providing one or more choices of PrintTickets stored in the device driver part and adding another choice of a PrintTicket stored in the other device driver part to the provided choices according to an instruction from a user.

8. The device controlling method as claimed in claim 5, wherein the device is a printer, wherein step b) includes the steps of displaying one or more graphic symbols corresponding to PrintTickets having setting data that can be applied to the control settings of the printer.

9. A non-transitory computer-readable recording medium on which a program is recorded for causing a computer including a device driver part to execute a method of controlling a device, the method comprising the steps of:
    a) storing device capability data;
    b) receiving a designation of a PrintTicket having setting data indicating control settings used for controlling the device;
    c) determining whether the designated PrintTicket has been fabricated by the device driver part or another device driver part;
    d) applying all of the setting data to the control settings in a case where the designated PrintTicket is determined to be fabricated by the device driver part;
    e) comparing the device capability data with the setting data and applying at least a part of the setting data to the control settings in a case where the designated Print-Ticket is determined to be fabricated by the other device driver part;

f) storing data of non-allowable control settings; and g) comparing all of or part of the setting data to be applied to the control settings in steps d) or e) with the non-allowable control settings and refraining from applying all of or part of the setting data to the control settings in a case where all of or part of the setting data are included in the non-allowable control settings.

10. The non-transitory computer-readable recording medium as claimed in claim 9, wherein step e) includes the steps of comparing the device capability data with the setting data and refraining from applying a part of the setting data, which is not included in the device capability data, to the control settings.

11. The non-transitory computer-readable recording medium as claimed in claim 9, wherein step b) includes the steps of providing one or more choices of PrintTickets stored in the device driver part and adding another choice of a PrintTicket stored in the other device driver part to the provided choices according to an instruction from a user.

12. The non-transitory computer-readable recording medium as claimed in claim 9, wherein the device is a printer, wherein step b) includes the steps of displaying one or more graphic symbols corresponding to PrintTickets having setting data that can be applied to the control settings of the printer.

* * * * *